(12) United States Patent
Ackerman

(10) Patent No.: US 10,071,918 B2
(45) Date of Patent: Sep. 11, 2018

(54) WATER HARVESTER AND PURIFICATION SYSTEM

(71) Applicant: John R Ackerman, Hazle Township, PA (US)

(72) Inventor: John R Ackerman, Hazle Township, PA (US)

( * ) Notice: Subject to any disclaimer, the term of this patent is extended or adjusted under 35 U.S.C. 154(b) by 259 days.

(21) Appl. No.: 14/916,497

(22) PCT Filed: Oct. 10, 2014

(86) PCT No.: PCT/US2014/059998
§ 371 (c)(1),
(2) Date: Mar. 3, 2016

(87) PCT Pub. No.: WO2015/057502
PCT Pub. Date: Apr. 23, 2015

(65) Prior Publication Data
US 2016/0229706 A1    Aug. 11, 2016

Related U.S. Application Data

(60) Provisional application No. 61/890,596, filed on Oct. 14, 2013.

(51) Int. Cl.
*C02F 1/04* (2006.01)
*B01D 1/00* (2006.01)
(Continued)

(52) U.S. Cl.
CPC ............ *C02F 1/048* (2013.01); *B01D 1/0017* (2013.01); *B01D 1/0035* (2013.01);
(Continued)

(58) Field of Classification Search
CPC .................................. C02F 1/14; B01D 5/003
See application file for complete search history.

(56) References Cited

U.S. PATENT DOCUMENTS 3,035,418 A * 5/1962 Wright ....................... E03B 3/28
62/176.1
3,431,179 A * 3/1969 Starmer ................. B01D 3/065
202/173

(Continued)

FOREIGN PATENT DOCUMENTS

WO    WO 2011018242 A2 *   2/2011   ................ C02F 1/10

*Primary Examiner* — Jonathan Miller
(74) *Attorney, Agent, or Firm* — Lawrence P. Zale; James R. McDaniel

(57) ABSTRACT

An optimized system creates potable water from water vapor in the atmosphere, or purifies salt water or contaminated water. The system employs a condenser having multiple metal condensation surfaces. These condensation surfaces are cooled by coolant passing through conduits attached to the condensation surfaces. The coolant is cooled by a cooling unit. Power is supplied to the cooling unit by solar photovoltaic panels, or wind turbines, or the electric grid. The system can be mobile or fixed and can produce potable water at remote locations. The system may employ an evaporator which evaporates non-potable water into an air stream. The evaporator includes a solar or gas heater which increases the temperature of the air. Metals may be extracted from the salt water. If sewage is used, solid organic waste may be processed into combustible gas which is burned by an engine running a generator to power that system.

38 Claims, 16 Drawing Sheets

(51) Int. Cl.
*B01D 5/00* (2006.01)
*C02F 1/14* (2006.01)
*C02F 1/16* (2006.01)
*C02F 1/00* (2006.01)
*C02F 103/08* (2006.01)

(52) U.S. Cl.
CPC ......... *B01D 1/0058* (2013.01); *B01D 1/0082* (2013.01); *B01D 5/0003* (2013.01); *B01D 5/006* (2013.01); *B01D 5/0054* (2013.01); *B01D 5/0078* (2013.01); *C02F 1/008* (2013.01); *C02F 1/14* (2013.01); *C02F 1/16* (2013.01); *C02F 2103/08* (2013.01); *C02F 2209/005* (2013.01); *C02F 2209/02* (2013.01); *C02F 2209/03* (2013.01); *Y02W 10/37* (2015.05)

(56) References Cited

U.S. PATENT DOCUMENTS

| | | | |
|---|---|---|---|
| 3,777,456 A * | 12/1973 | Lund | C02F 1/10 95/192 |
| 4,276,124 A * | 6/1981 | Mock | B01D 1/26 202/236 |
| 2004/0040322 A1* | 3/2004 | Engel | |
| 2006/0278089 A1* | 12/2006 | Theilow | B01D 53/263 96/290 |
| 2007/0151262 A1* | 7/2007 | Bailey | B01D 5/0009 62/93 |
| 2010/0083675 A1* | 4/2010 | Merritt | E03B 3/28 62/93 |
| 2013/0145782 A1* | 6/2013 | Ritchey | B01D 53/265 62/119 |
| 2013/0178987 A1* | 7/2013 | Meirav | F24F 11/0001 700/276 |

* cited by examiner

WATER HARVESTER AND PURIFICATION SYSTEM

CROSS REFERENCE TO RELATED APPLICATIONS

This application claims priority to U.S. Provisional Application "Water Harvester" Ser. No. 61/890,596 filed Oct. 14, 2013.

BACKGROUND

1. Field of Invention

The present invention relates generally to apparatus designed to harvest moisture and purify non-potable water, and more particularly, to harvest moisture and purify non-potable water to produce potable water.

2. Description of Related Art

Increasing population requires more clean water. Urban population growth will increase demand for household water, and the need for clean, potable water will increase. Conventional water supplies will run short because of increased demand and local overuse of natural water supplies.

Large amounts of potable water are currently being used by industries which release chemicals into the water that make the water unfit for drinking. One industry use which uses large amounts of water is hydraulic fracking. Much of the fracking solutions are not purified, further reducing the clean water supply.

Some non-operational industries, such as the coal mining industry have ceased operations in certain areas. Since some of them went bankrupt, they have left abandoned mines which now release large amounts of mine drainage into waterways.

Similarly, sometimes wastewater, water contaminated with microorganisms, pharmaceuticals and fertilizers make large amounts of water unfit for drinking.

Another source of non-potable water is salt water, such as seawater or brackish water.

Salt water can be desalinated to create fresh water by conventional methods; however these are not practical in certain regions. The best known methods for desalinization are a) vacuum evaporation by boiling, b) distillation or c) reverse osmosis.

Unfortunately, boiling and distillation requires significant energy to operate efficiently and the resultant cost of treated water puts this technology out of reach for the majority in need. Desalination plants exist in rich nations such as the United States and Saudi Arabia but are not feasible everywhere due to the costs. The lack of capital in developing nations makes large desalination plants with high-volume production impractical.

Another method of desalinating salt water is by using reverse osmosis. Desalinating by reverse osmosis requires placing water under high pressure and forcing the water through porous membranes. The pores are sized to allow water molecules through but do not pass charged ions, such as salt ions. Reverse osmosis requires equipment to raise the water pressure to high levels, again requiring significant energy. Reverse osmosis also only results in a small volume of clean water being produced. Therefore, while it is not very economical or efficient to use reverse osmosis for desalination, it is the most widely used method for desalination, despite its high costs.

Even if one were to use one of these methods, they typically are done in stationary plants and the clean water would have to be transported to where it is needed. Producing potable water near its place of use removes the requirement for transporting the water to where it is needed. Therefore, pipelines, canals or tanker trucks are not required.

Production of high-quality water at or near its place of use is superior to transporting drinking water, which requires substantial consumption of energy for delivery and if bottled, container waste disposal.

Another source of water is moisture in the air. Current technology exists that utilizes fans, pumps, and refrigeration units to extract water vapor from the air; however, it is dependent on electricity or fossil fuels to power the devices. These technologies are not suitable for much of the world's population where artificial power sources are not readily available.

There currently is a global need for cost-effective, simple, efficient, stationary and mobile systems for producing potable water where it is needed.

SUMMARY

One embodiment of the present invention takes the form of an apparatus capable of harvesting atmospheric water. The apparatus includes a harvester comprised of a thin sheet of material connected to a cooling source. As the surface of the thin sheet is cooled, evaporated water condenses and precipitates on to the thin sheet. The precipitated water is then collected.

Another embodiment of the present invention may take the form of a desalinization apparatus. In this embodiment, seawater or other brine may be loaded into a basin and evaporated. The process of evaporation separates fresh water from the minerals. The evaporated water may then be brought in proximity to the thin sheet, thereby condensing and collecting the fresh water.

Still another embodiment of the present invention may take the form of a wastewater treatment apparatus. In this embodiment, municipal or industrial waste waters may be loaded into one or more process vessels. The wastewater may then be evaporated, with fresh water condensing on the thin sheet.

An embodiment of the current invention may be described as a system for producing potable water having a fan for creating an air stream of ambient air and a condenser within the air stream having a number of conduits adapted to carry a liquid coolant. The liquid coolant reduces the temperature of the condenser and surrounding air below the dew point of the ambient air, causing moisture in the ambient air to condense on the condenser.

A cooling device that runs on electric power is coupled to the conduits and is adapted to lower the temperature of the liquid coolant below a dew point of the ambient air.

A solar photovoltaic array creates electric power to power the system.

A plurality of sensors is adapted to measure physical parameters of the system and provide their measurements to a control unit coupled to the sensors. The control unit is also coupled to the fan, the cooling device and the photovoltaic array and can read information from the sensors and adjust elements of the system accordingly to optimize operation of the system.

The current invention may also be embodied as a system for producing potable water from non-potable water having an evaporator with a chamber for receiving, containing and heating a stream of air, a second chamber for receiving non-potable water having an air passageway in contact with the non-potable water and an airflow exit, at least one passageway fluidically connecting the first chamber to the second chamber allowing the heated stream of air to pass from the first chamber through the second chamber and out of the airflow exit, thereby increasing the amount of water vapor in the air stream leaving the airflow exit. The system also includes a condenser fluidically coupled to the airflow exit of the evaporator adapted to receive the moist airstream, a number of condensation surfaces cooled by a coolant to a temperature below the dew point, causing the moist airstream to condense the water vapor in the air stream into potable liquid water. At least one cooling unit is adapted to cool the coolant to a temperature below the dew point of the moist air. A plurality of sensors measure physical parameters of the system. A control unit is coupled to the sensors, the fan, the cooling device and the photovoltaic array. The control unit reads information from the sensors and adjusts elements of the system accordingly to optimize operation of the system. The system is powered by a solar photovoltaic array adapted to create electric power. There also may be a windmill driving an electric generator acting to power the system. Battery storage may be employed to store electricity for later use. In alternative embodiments, the system also employs at least one pressure sensor adapted to measure pressure within the conduit; and the control unit is coupled to the pressure sensors and fan for interactively measuring the pressure within the vessel to adjust the fan operation to optimize condensation.

The system may also employ a number of temperature sensors adapted to measure temperature at various locations within the conduit, and a heating device in the evaporator. The control unit is coupled to at least one of the temperature sensors and the heating device for interactively measuring the temperature within the vessel to adjust the heater operation to optimize evaporation.

The current invention may also be embodied as a system for creating potable water from non-potable water employing an evaporator section employing a plurality of evaporators, with each evaporator having an input for receiving input air and an output for exhausting air. Each evaporator is adapted to evaporate non-potable water into an input air stream received at its input and to create a moist air stream at its output. The evaporators are connected in series such that the output of one is coupled to the input of the next. The system also employs at least one humidity sensor near the input of each evaporator capable of determining the relative humidity, a bypass conduit which bypasses at least one evaporator, at least one bypass valve adapted to divert the moist air stream to the bypass conduit when activated, a control unit coupled to the humidity sensors and at least one bypass valve, adapted to sense when the humidity of the moist air stream exceeds a predetermined level and to activate at least one bypass valve causing the moist air stream to bypass at least one evaporator, and a condenser for receiving the moist air stream and condensing potable water from the moist air stream.

The current invention may also be embodied as a system for creating potable water from non-potable water having an evaporator for receiving the non-potable water and evaporating it into a moist air stream flowing in a direction, a condenser section employing a plurality of condensers, each positioned behind a previous one within the direction of the moist stream such that the air stream must flow past a first condenser to reach a next condenser, wherein the condensers receive a liquid coolant to reduce their temperature below the dew point of the moist air; at least one humidity sensor between the condensers, for measuring the relative humidity, a bypass conduit which bypasses at least one condenser; at least one bypass valve adapted to divert the moist air stream to the bypass conduit when activated, a control unit coupled to the humidity sensors coupled to the sensors and the at least one bypass valve, adapted to sense when the humidity of the moist air stream drops below a predetermined level and to activate at least one bypass valve causing the moist air stream to bypass at least one condenser.

These and other advantages and features of the present invention will become apparent to those of ordinary skill in the art upon reading this disclosure in its entirety.

BRIEF DESCRIPTION OF THE DRAWINGS

The advantages of the instant disclosure will become more apparent when read with the exemplary embodiment described specification and shown in the drawings, wherein.

DETAILED DESCRIPTION

Figure 1:
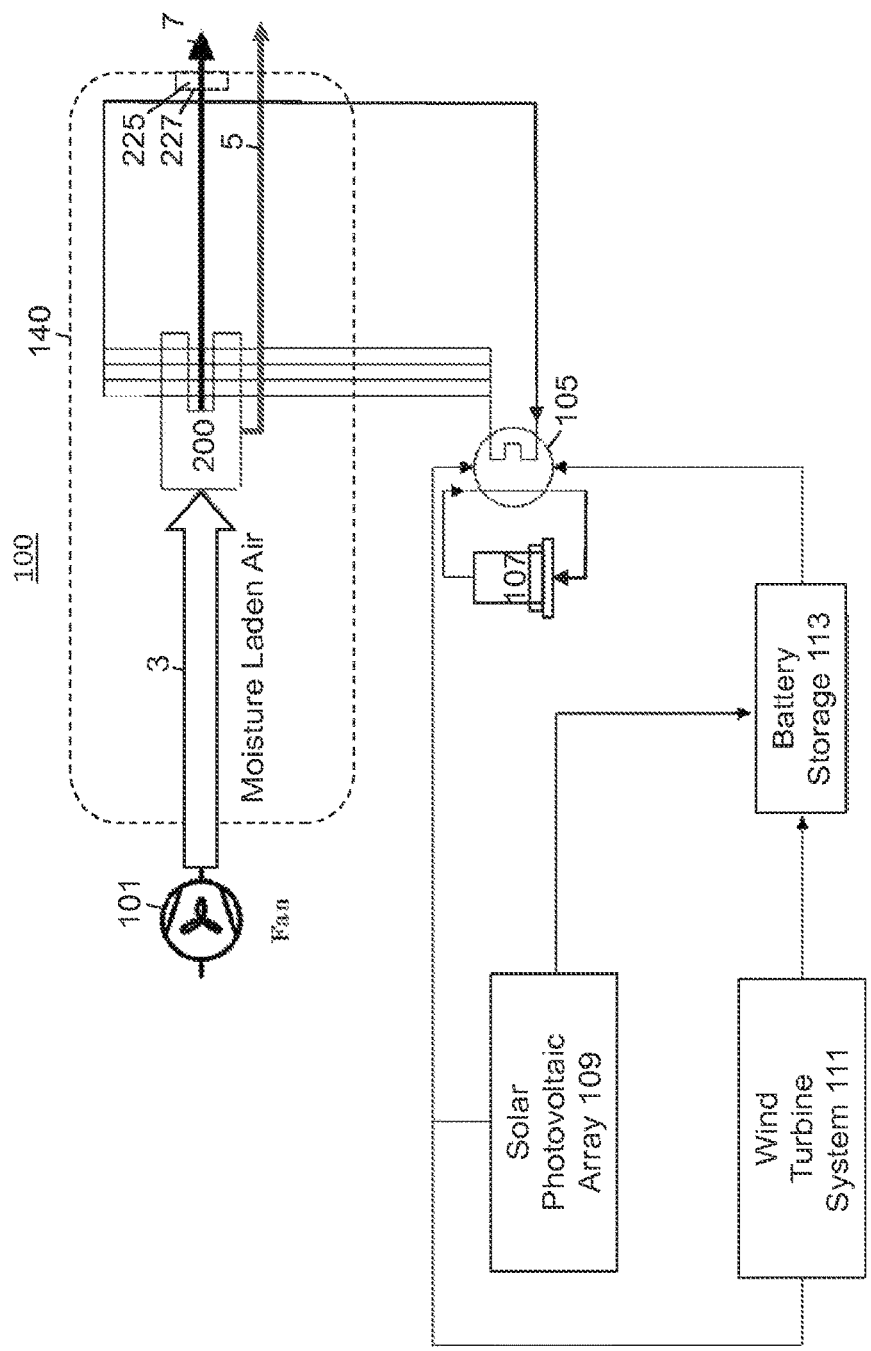
FIG. 1 is an overall block diagram of one embodiment of a water harvesting system for extracting water from the air according to the present invention.

The present invention will now be described in detail by describing various illustrative, non-limiting embodiments thereof with reference to the accompanying drawings. The invention may, however, be embodied in many different forms and should not be construed as being limited to the illustrative embodiments set forth herein. Rather, the embodiments are provided so that this disclosure will be thorough and will fully convey the concept of the invention to those skilled in the art. The claims should be consulted to ascertain the true scope of the invention.

The conventional methods of distillation and reverse osmosis are not feasible in the third world countries where the water is needed the most. The device and process proposed in this application use neither of these methods. It is an evaporative method that uses the natural process of evaporation of a liquid into air.

The proposed process is the opposite of conventional evaporation devices wherein the water is heated to move the water molecules from the liquid phase to the vapor phase. In this device, the air is heated so that the water-carrying capacity of the air increases over the water-carrying capacity available at lower temperatures. This alone does not produce high rate evaporation, as the air at the water/air interface becomes rapidly saturated with water vapor and the rate of evaporation decreases significantly and rapidly. To effect high rate evaporation of the water volume, the saturated air at the water/air boundary must be removed and replaced with moisture-deficient air. A fan or blower may be used to effect this movement from the evaporator unit.

Constrained Optimization

The system of the current application is optimized to produce high rate production of potable water for the least cost that is compatible with existing resources. Since the water is intended to be potable, there must be less than a predetermined acceptable level of contaminants. The evaporator and the condenser are each optimized for the least cost to produce the required amount of potable water.

Evaporator Optimization

To optimize the evaporator, one would like to increase the surface area interaction between the water and the air. On way to do this is by creating a microclimate near the water. A microclimate is a local atmospheric zone where the climate differs from the surrounding area. Thereby by at least partially enclosing a volume near the water's surface, humidity near the water surface creates a microclimate. The airflow then carries humid air from this microclimate away. One would also try to increase the air flow rate to increase the amount of potable water produced. Therefore, bubbling the air through the non-potable water would increase surface area interaction; however, at higher flow rates this causes droplets to become entrained in the air stream, contaminating it, making the water non-potable.

Therefore, it was found that running a laminar air stream over the non-potable water would cause the water to evaporate into the air stream at high volumetric flow rates. If the air stream has laminar flow, few droplets become entrained in the air steam, even at higher air velocities. This allows more throughput of the water vapor.

It was also determined that a large surface area having laminar air stream rather than a turbulent air stream passing over the surface of the non-potable water achieved very good results. It was also determined that only the air adjacent the water surface received water vapor. Therefore, the height of the air flow chamber was minimized to maximize air relative humidity, and keep the flow laminar.

Condenser Optimization

It was determined that using metal sheeting with common metal piping material that was either cast or fabricated was the most cost-effective way to make condensers while achieving acceptable heat transfer efficiency. Again, creating a local microclimate around the condenser surface creates cooled air which interacts with the moist humid air, causing precipitation even before the moist air touches the condenser surfaces. The efficiency of this design was measured for various temperatures. The square footage required to condense the water vapor provided by the evaporator was then determined.

To convert the water from the vapor phase back to the liquid phase a condenser must be used to create microclimate where the temperature surrounding the condenser unit is lowered to a point below the dew point of the air wherein upon contact with the microclimate, the water will condense through precipitation. The now moisture-deficient air is directed back to the evaporator unit. The salts or contaminants present in the original water source remain behind in the concentrate left in the evaporator and the precipitated water is potable and ready for human consumption.

Embodiments

The embodiments of this application may be classified into three categories, such as those that:
1) directly remove moisture from the atmosphere, referred to as a 'water harvesting system',
2) desalinate salt water, referred to as a 'desalination system', and
3) purify contaminated water, or non-potable water in the environment, such as from a river stream, settling pond, lake, or other body of water, referred to as a 'water purification system'.

1) Water Harvesting System

The water harvesting device designed for atmospheric operation condenses water directed to the unit from the atmosphere where it precipitates as it contacts the microclimate modifications surrounding the condensation panels.

While there will be some condensation of the moisture as it comes in contact with the panels, the majority of the condensation will occur in the zone of cooled air surrounding the panel surface where the dew point of the air mass is reduced in relation to the dew point of the air carrying the moisture effecting rapid condensation of the water molecules.

Embodiments of the invention are discussed below with reference to FIGS. 1-7. However, those skilled in the art will readily appreciate that the detailed description given herein with respect to these figures is for explanatory purposes as the invention extends beyond these limited embodiments.

FIG. 1 is a block diagram of a water harvester apparatus 100 for extracting moisture from the atmosphere. The apparatus 100 is comprised, in part, of a condenser 200 connected to a coolant device 105, which may be a water chiller or any device which cools a circulating fluid capable of transferring heat referred to as a coolant. The coolant device 105 receives and cools the coolant passing through condenser 200. In preferred embodiments of the present invention, a fan 101 is included to direct ambient moisture laden air 3 through the condenser 200. It also may include a cooling tower 107 that couples with the coolant device 105 to absorb the heat extracted by the coolant device 105 and dissipate the heat through the cooling tower 107.

Preferred embodiments also include a power source that may take the form of a storage battery 113 fed by a solar photovoltaic array 109 and/or wind turbine system 111. The power source is used to operate the coolant device 105, and is able to do so where power is unavailable.

In an alternative embodiment, the condenser 200 may be enclosed in a containment vessel 115 having an air flow valve at an air exit, where the dry air 7 exits the system. By using the fan 101 to force air into the containment vessel 115, a slightly higher air pressure is created. Since air releases moisture as pressure decreases, this further increases the amount of potable water 5 created. The air flow valve 225 is adjustable so that the amount of flow and the pressure may be adjusted to optimize the potable water 5 created. Optionally, a control unit may monitor the pressure inside of the containment vessel 115, and operate the air flow valve 225 to interactively optimize the water harvester system 100.

Figure 2:
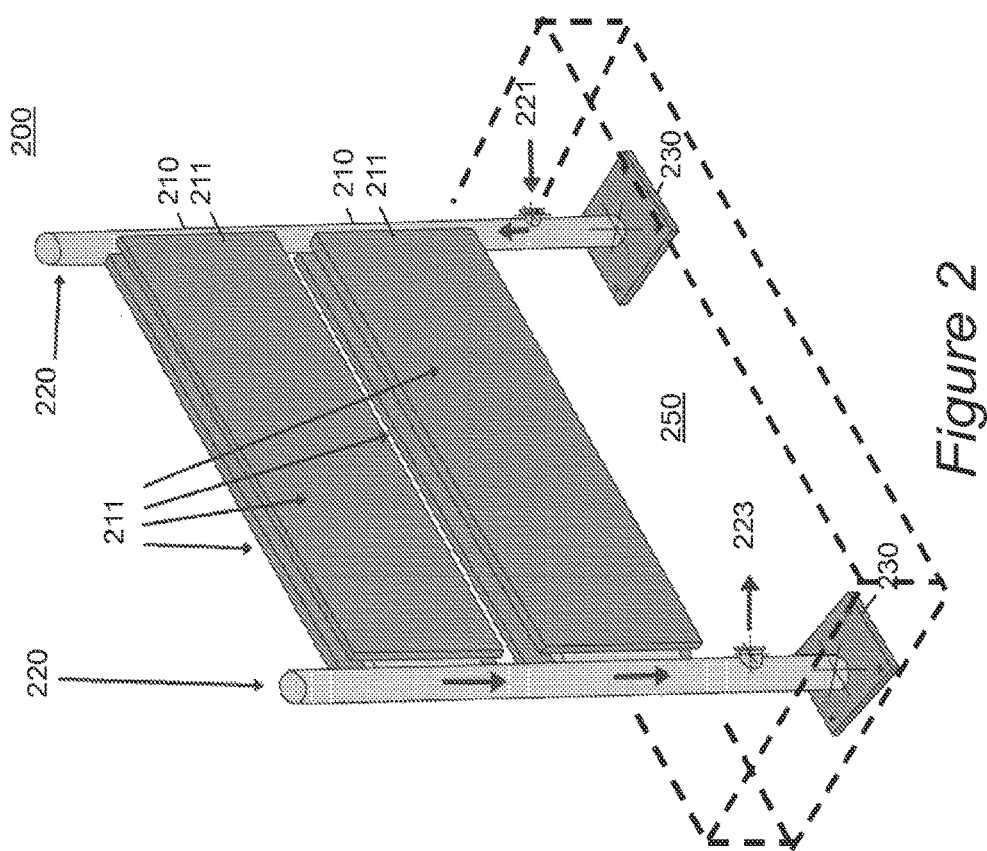
FIG. 2 is a diagram of one embodiment of a condenser section according to the present invention.

FIG. 2 shows a preferred embodiment of the condenser 200 of FIG. 1. The condenser 200 may be mounted to a base using mounting supports 230. It may also include a plurality of panels 210 arranged above each other. The panels 210 in one embodiment are covered with thin metal sheets each referred to as a collection surface 211. The panels 210 are preferably manufactured of thin-gage stainless steel and have varying dimensions dependent on the water volume and condensation rate desired. In certain embodiments, the sheet dimensions are approximately 8 feet wide×6 feet high with an overall height of 12 feet.

A coolant at a low temperature enters the inlet 221 of the distribution piping 220. The coolant flows through the distribution piping 220 and through the panels 210 to the distribution piping 220 on the opposite side of the panels 210 and out of the outlet 223. The purpose is to cool the collection surfaces 211 below the dew point to cause condensation of moisture in the air impacting the collection surfaces 211 and the cooled air volume (microclimate) surrounding the collection surfaces. The moisture that condenses is pure, potable water and falls into an optional collection basin 250 which collects it.

In a preferred embodiment, the panels 210 include an integrated series of stainless steel tubes, referred to as intermediate tubes, passing through them.

Figure 3:
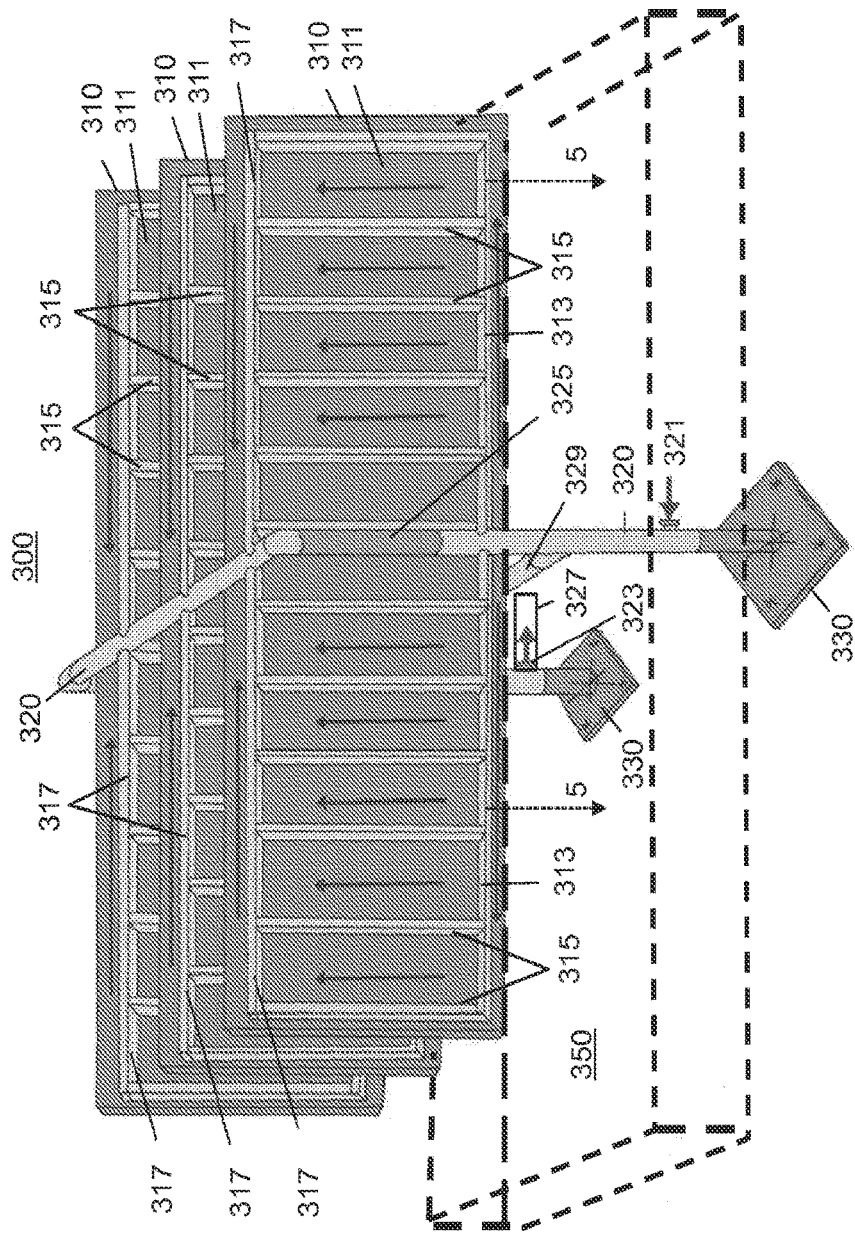
FIG. 3 is a diagram of another embodiment of a condenser section of the present invention.

FIG. 3 is another preferred embodiment of the condenser shown as condenser structure 300, which may be used in place of condenser 200. It may be mounted to a base with mounting supports 330. This embodiment has several panels 310 behind each other with respect to the direction of air flow. Low temperature coolant enters the distribution piping 320 at inlet 321.

This embodiment also includes an integrated series of stainless steel tubes referred to as intermediate pipes 315 that abut the water harvest collection surfaces 311. Coolant enters distribution pipes 320 at inlet pipe 321 then passes through a lower common pipe 313 and a cross pipe which feeds the other panels 310. The coolant then flows through the lower common pipe 313 then upward through the intermediate pipes 315 to collect in the upper common pipes 317. This cools the water harvest collection surfaces 311 and attendant microclimate below the dew point of the ambient air in the air flowing past the condenser structure 300. Distribution pipes 320 have a discontinuity 325 which prevents the coolant from bypassing panel 310.

Cooling the water harvest collection surfaces 311 and microclimate causes the humid air in the air stream passing the surface of the thin sheet to cool as well, thereby condensing the moisture therein. As the moisture carrying capacity of the air volume is exceeded, water condenses both on the water harvest collection surfaces 311 and within the microclimate volume and drops into an optional collection basin 350 resulting in potable water.

It is preferred that the conduits carrying coolant and the panels are not exactly horizontal, but slightly inclined. This allows condensation to run to a common lowest point and drip into a collection basin.

2) Desalination System

The current system may also be embodied as one that efficiently desalinates salt water, including brackish water, saline hydraulic fracturing water used in "fracking", and seawater.

The design of the system to treat salt water is twofold: 1) the first portion of the method is to create a precisely designed environment, causing a large amount of water vapor to be evaporated into a volume of air, and, 2) creating an environment and condensation chamber conducive to rapid condensation of the evaporated moisture from the atmosphere.

Figure 4:
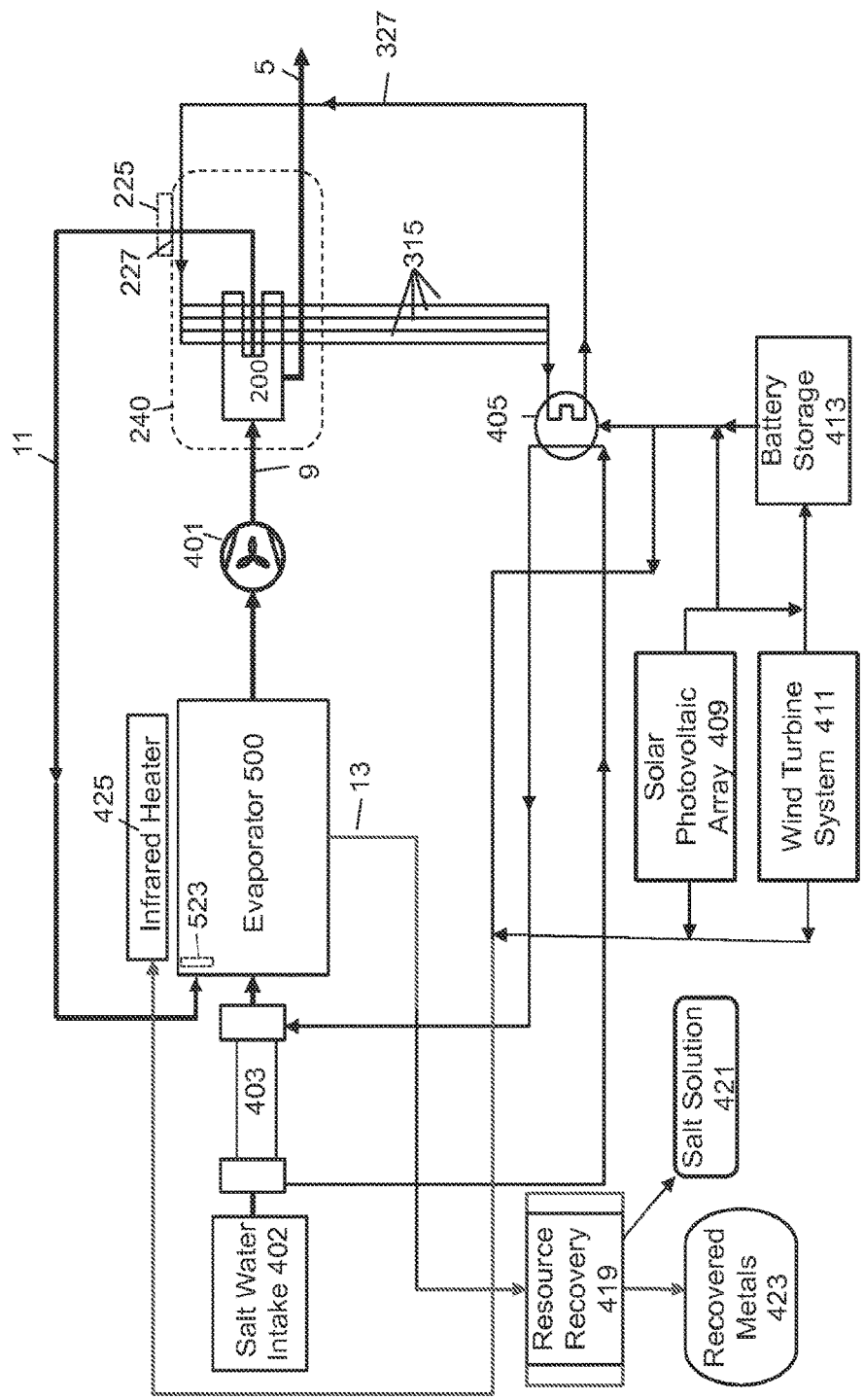
FIG. 4 is an overall block diagram of one embodiment of a salt water purification system according to the present invention.

FIG. 4 shows an embodiment of a desalination system. Salt water, such as seawater, is received at a salt water intake 402. The salt water received is passed through a heat exchanger 403 coupled to a coolant device 405. The cold seawater extracts heat from a hot side of a coolant device 405. The coolant device 405 may be a refrigeration unit or a heat pump. These typically pump heat out of one area and release it to another area. In this case, the coolant device 405 is pumping heat out of the coolant running through the condenser 200. The heat is then passed through the heat exchanger 403 to preheat the salt water entering the evaporator 500. While the additional heat allows for faster evaporation of the salt water, it is optional and not necessary for the operation of the system. Typically, the evaporator 500 is heated by the sun; however, an infrared heater 425, or other type of heater may be used at night, or when the sky is overcast. Moisture depleted dry air 11 also enters the evaporator 500. The moisture depleted dry air 11 receives water vapor as it evaporates to result in moist air 9.

The evaporator 500 also releases the salt water concentrate 13 which is what remains after much of the water is removed. This salt water concentrate may have dissolved minerals, and heavy metals. These may be gold, silver and other valuable substances. A resource recovery device 419 receives the salt water concentrate and processes it to increase the concentration of the brine and allow concentration of dissolved metals to low grade ore levels for the recovery of metals. This process is used to extract and recover metals 423 and other substances. What remains is salt solution 421 which is returned to the water source, or is processed for industrial or commercial uses.

The moist air 9 is then brought into proximity of the condenser 200 or 300 as indicated in FIG. 1 above and performs the same functions to result in potable water 5 being produced.

The coolant device 405 functions in much of the same manner as coolant device 105 of FIG. 1.

The coolant device 405 is optionally powered by solar photovoltaic array 409, wind turbine 411 and battery storage 413, similar to elements of the same names in FIG. 1.

Figure 5:
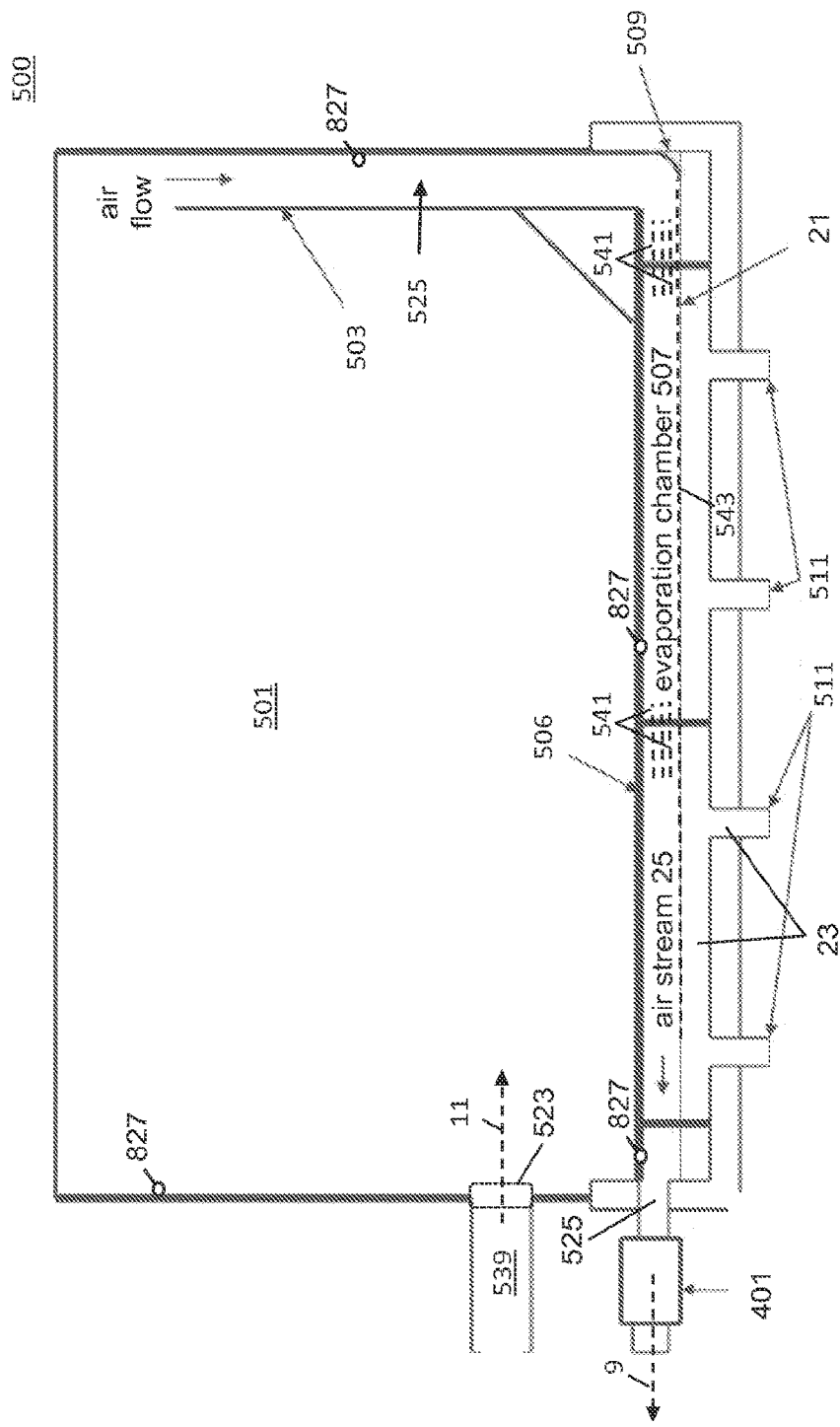
FIG. 5 is a side elevational diagram of one embodiment of an evaporator section according to the present invention.
Figure 6:
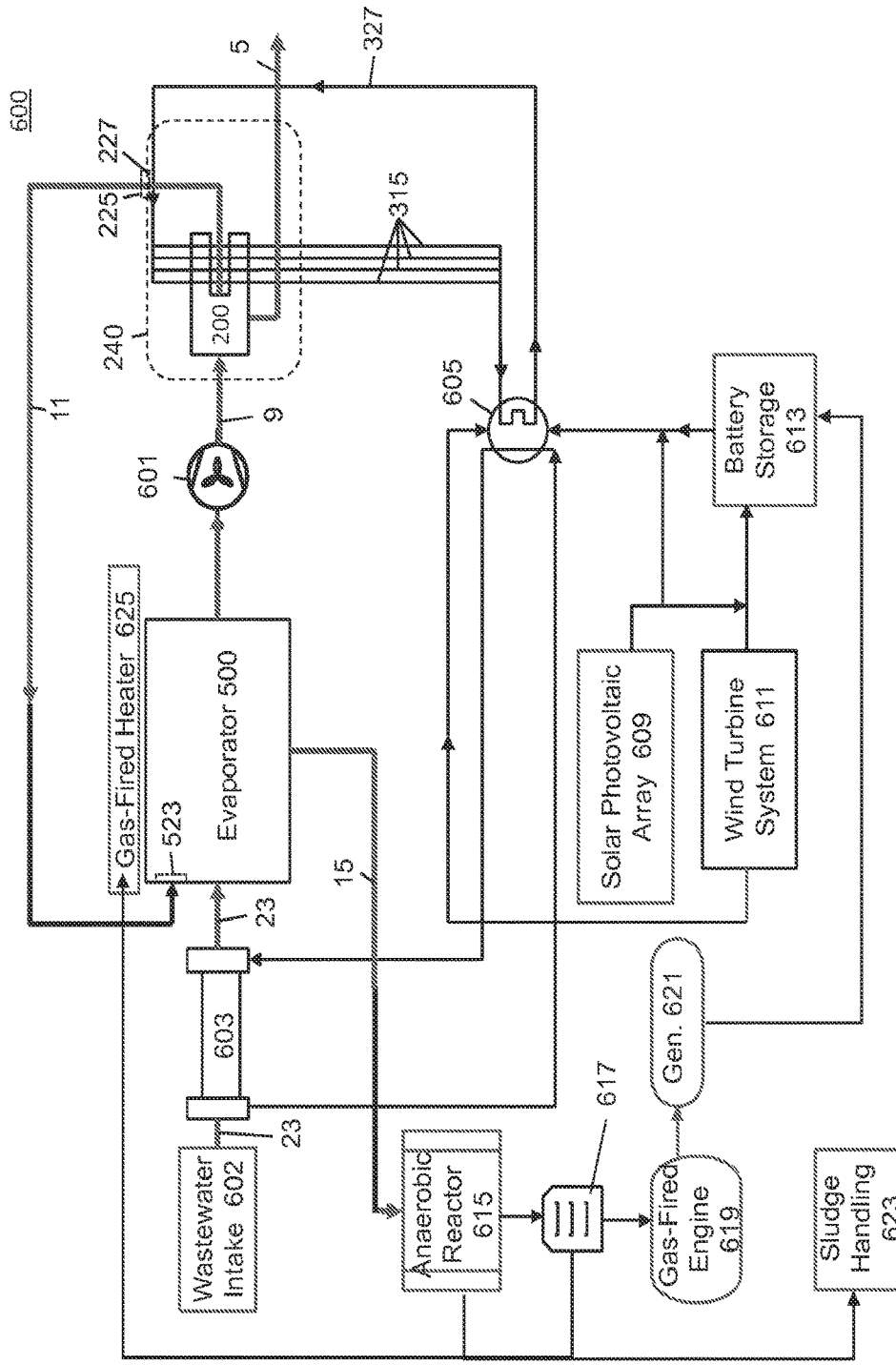
FIG. 6 is an overall block diagram of one embodiment of a wastewater purification system according to the present invention.
Figure 7:
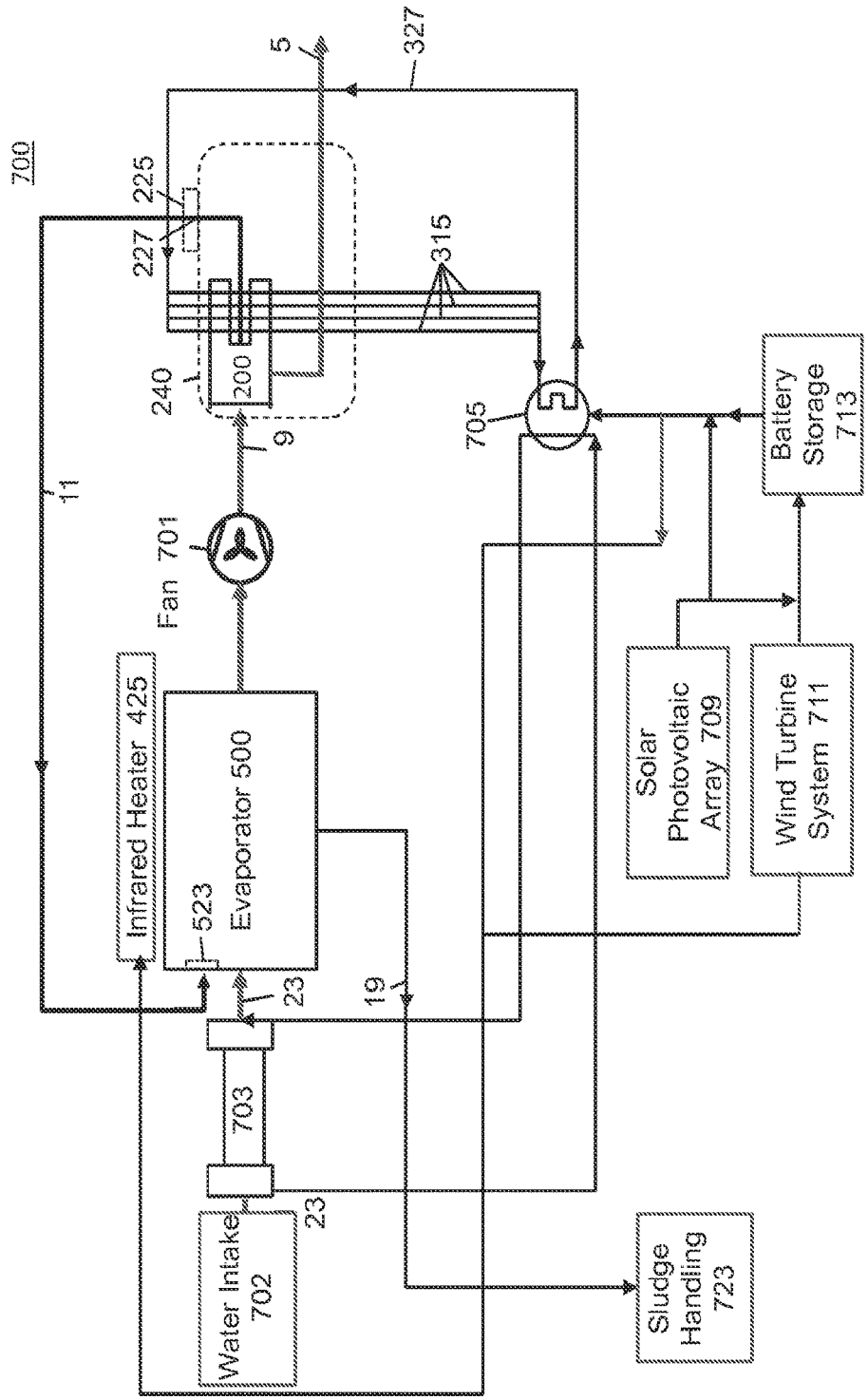
FIG. 7 is an overall block diagram of one embodiment of a river water purification system according to the present invention.

FIG. 5 is a side elevational diagram of one embodiment of an evaporator 500 of FIGS. 4, 6, and 7 according to the present invention. Please note that going forward, salt water, sewage water, polluted water, water contaminated with chemicals, and other non-potable water may be collectively be referred to as "non-potable water".

The evaporator 500 is designed to evaporate the largest amount of into the air without suspending non-potable water 23 droplets in the air stream 25. Since this system is optimized to create large amounts of potable water, it must use a high air flow rate that does not kick up water droplets.

Moisture depleted dry air 11 enters a heating chamber 501 from a return air distribution plenum 539. The heating chamber 501 may be a greenhouse-like structure or other structure designed to collect the energy from the sun. An air baffle 503 arranged vertically creates an air flow channel 525 which is separated from the air heating chamber 501 by the air baffle 503.

A straightening plenum 509 is positioned at the end of the air flow channel 525 to redirect the downward air stream to a horizontal air stream 25.

A separation deck 506 is a horizontal separator which creates a top of an evaporation chamber 507. The water surface 21 in the evaporation chamber 507 creates the floor. The evaporation chamber 507 is designed to allow an air stream with a significant amount of volumetric flow to pass between the separation deck 506 and the water surface 21 of non-potable water 23 with little or no turbulence. It is intended to have laminar airflow. The air flow along the surface of the non-potable water 23 in the evaporation chamber 507 allows a substantial amount of water molecules to be released from the surface and jump into the vapor phase. As indicated above, the width, length and shape are designed to have substantial laminar air stream. The laminar air flow reduces the amount of non-potable water 23 being swept up by the air stream as suspended water droplets, reducing the potential for contamination for the purified water. The closed evaporation chamber 507 creates a micro climate of high humidity which is highest at the air water boundary. This boundary layer air absorbs moisture to have a high relative humidity. Once the relative humidity is high, the air absorbs little additional moisture. Therefore, this boundary layer must be constantly replaced.

There are water inlets 511 underneath the water in the evaporation chamber 507. The non-potable water 23 enters here to replace the water that has evaporated.

A fan 401 draws the moist air 9 out of the evaporator 500, thereby causing a slight reduction of the air pressure. If the air flow valve 523 is partially closed, the air pressure is further reduced. Reduced air pressure facilitates evaporation of water into the flowing air.

In an alternative embodiment of the described system, the evaporation chamber 507 includes elongated vanes 541 along the air stream direction which facilitate laminar air stream. The vanes 541 run parallel to the length of the evaporation chamber 507 which minimize turbulence and increase laminar flow of the air stream 25 along the length of the vanes 541. These vanes may run for any length of the evaporator chamber 507.

In order to minimize the amount of liquid droplets from becoming swept up into the air stream 25 and becoming entrained in the airstream and contaminating the air stream 25, a barrier is to be used. This barrier may be a screen 543 as shown in FIG. 5. Water droplets get caught in the screen and accumulate. When enough accumulate, they drop back into the non-potable water 23 in the bottom of the evaporation chamber 507. This screen 543 may run only the length of a portion which exhibits substantial turbulence or increased air flow velocity, or it may extend the entire length of the evaporation chamber 507.

There may be sensors 827 throughout the evaporator 500 which measure any physical parameter, such as temperature, relative humidity, air velocity, air turbulence, etc. These can be monitored by a control unit (825 of FIG. 8) which then makes decisions based upon the input received, makes decisions and actuated elements of the system to optimize the operation of the system.

In an alternative embodiment of the described system, the evaporation chamber 507 includes a narrowed portion followed by an enlarged portion, thereby causing an area of reduced air pressure, allowing for greater evaporation into the airstream.

3) Water Purification System

Another embodiment of the system described in this application purifies contaminated water. This contaminated water may be hydraulic fracturing brines which include other chemical contaminants besides the dissolved salts, abandoned mine water discharges, industrial wastewater, municipal wastewater, waters containing pharmaceuticals, fertilizers, or other chemicals, and water containing microorganisms, such as giardia and cryptosporidium spores.

Referring now to FIG. 6, an alternative embodiment of the present invention comprises a waste water system 600 capable of producing fresh water from wastewater such as having sewage with human waste. The elements function similarly to their counterparts in the desalination system 400 of FIG. 4. Wastewater is received at the wastewater intake 602 and is preheated by heat exchanger 603. A fan 601 draws moist air 9 from the evaporator 500 and passes it over a condenser 200 causing potable water 5 to be collected. Condenser 200 is cooled by a coolant cooled by a coolant device 605. The evaporator 500 receives wastewater with organic solid matter, such as human feces. There will also be dissolved organic material. The dissolved and solid organic material of the wastewater may be referred to as biochemical oxygen demand (BOD) material. In this embodiment, special material handling equipment should be used to extract solid materials and concentrated BOD material, referred to as concentrated wastewater 15 from the wastewater before it is evaporated. The concentrated wastewater 15 is provided to an anaerobic reactor 615. This will be used to create methane and other combustible gases. The water vapor in the collected gases is removed by a gas dryer 617 using conventional equipment and methods. The dried gas is now available to be used as fuel for a gas-fired engine 619. The gas-fired engine 619 drives a generator 621 to create electric power that is provided to battery storage 613.

In an alternative embodiment, the power is provided directly to the coolant device 605 and to any other piece of equipment requiring electric power, such as pumps and fans.

The gas from the gas dryer 617 is also provided to a gas-fired heater 625. This heats the air in the evaporator 500 that is used to absorb the water vapor.

FIG. 7 discloses a water purification system 700 for non-potable water other than salt water. This may include natural bodies of water such as lakes, streams and ponds. Non-potable water 23 is received at the water intake 702 and is preheated by heat exchanger 703. A fan 701 draws moist air 9 from the evaporator 500 and passes it over a condenser 200 causing potable water 5 to be collected. Condenser 200 is cooled by a coolant cooled by a coolant device 605. This functions the same as the salt water system 400 of FIG. 4, except that it does not include the elements for resource recovery 419 and an element to hold the recovered metals 423 since this water typically has little valuable metals to recover. It also does not include an element to collect the salt solution 421. These elements are replaced by a sludge handling element 723. This takes the sludge from the evaporator 500 and disposes it.

Figure 8:
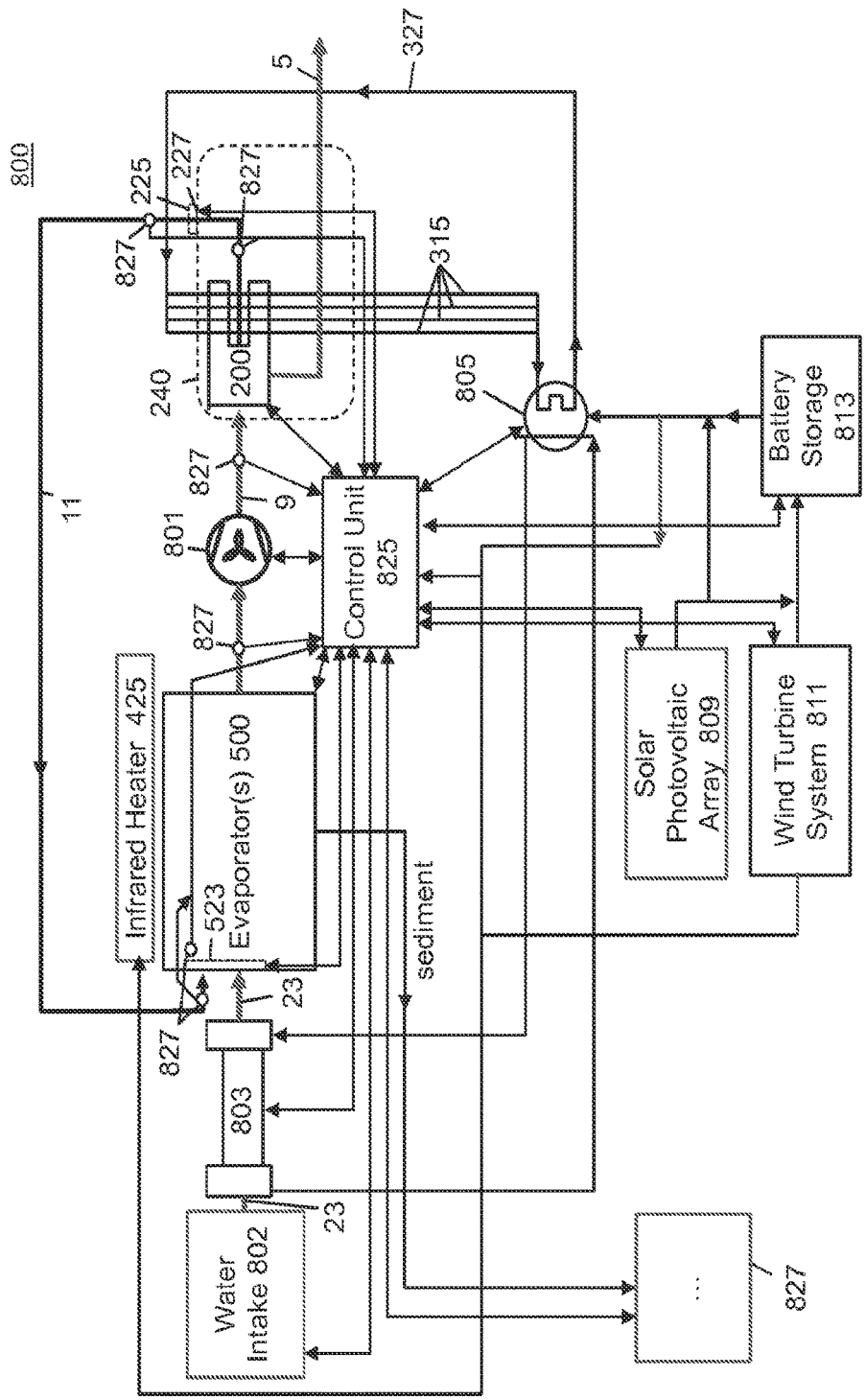
FIG. 8 shows an alternative embodiment of the system which may be implemented into the systems of FIGS. 4, 6 and 7.

FIG. 8 shows an alternative embodiment of the system which may be implemented into the systems of FIGS. 4, 6 and 7. Block 827 represents elements of these previous figures that are not shown in FIG. 8.

Wastewater is received at the water intake 802 and is preheated by heat exchanger 803. A fan 801 draws moist air 9 from the evaporator 500 and passes it over a condenser 200 causing potable water 5 to be collected. Condenser 200 is cooled by a coolant cooled by a coolant device 805.

In this embodiment, a plurality of sensors 827 are located within the air stream to measure at least one of air temperature, air humidity, air flow rate, turbulence and other physical parameters. These sensors 827 may be located in or after the evaporator, in or after the condenser 200 or on either side of the air flow valves 225 and 523. These connect to the control unit 825. Control unit 825 reads all necessary input from the sensors and makes determinations on how the system is running and what adjustments must be made to achieve the desired results.

Control unit 825 is connected to fan 801 and can read its current status. This may include the current it is receiving, its speed, the load, its past operation parameters values over time which can be paired with other information pertaining to the same time. The control unit can start, stop, adjust the speed and otherwise operate the fan.

Control unit 825 is connected to a coolant device 805. It can read any pertinent information from the coolant device 805 and also record this information along with its time of acquisition. The control unit can start, stop, adjust the speed, output and otherwise operate the coolant device 805. Control unit 825 is connected to all elements of the system and monitors them as well as actuates them to optimize the system.

In an alternative embodiment based upon FIG. 8, there may be more than one fan, located at the inlet and/or outlet of the evaporator 500, or the vessel 240 or anywhere within the evaporator 500, the vessel 240 or other conduits of the system. Each fan may be interactively and independently controlled by the control unit 825 to adjust the air flow rate entering the evaporator 500/vessel 240, exiting the evaporator 500/vessel 240 and any airflow within the evaporator 500/vessel 240. The varying air flow velocities can adjust local air pressures and be used to optimize the operation of the evaporator 500/vessel 240.

Also, the air flow valves 523 of the evaporator 500 and 225 of the vessel 240 may be interactively and independently controlled by the control unit 825 in combination with the fans to adjust the air flow and pressures in various parts of the system to optimize its operation. In an additional embodiment, there may also be an air flow valve on an outlet of the evaporator(s) 500 and on an inlet of the vessel(s) 240. These may also be independently and interactively controlled by the control unit 825 along with other air flow control devices and fans to optimize the system.

Figure 9:
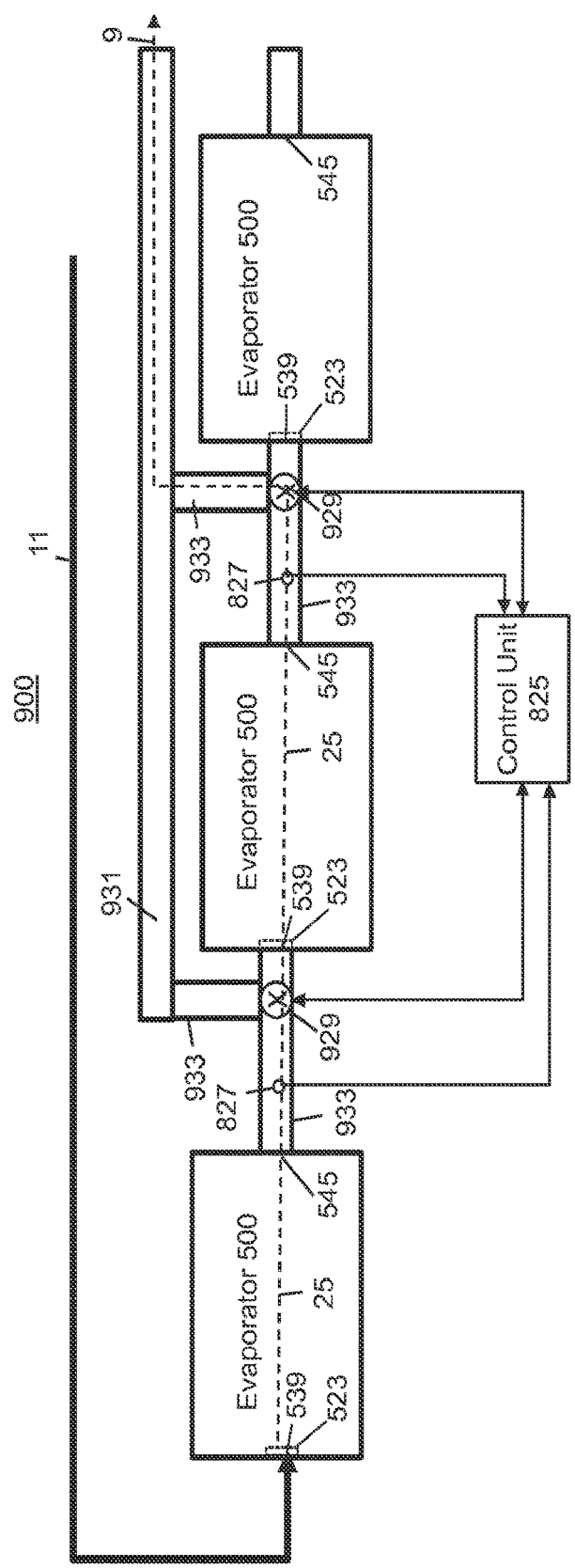
FIG. 9 shows an alternative embodiment of a portion of the system relating to the evaporator which may be merged into the systems of FIGS. 4, 6, 7 and 8.

FIG. 9 shows an alternative embodiment of a portion of the system relating to the evaporator which may be merged into the systems of FIGS. 4, 6, 7 and 8. This evaporator section 900 can be used to replace the evaporator 500 of the previously described embodiments.

Depending upon the air flow rate, and the efficiency and size of the condensers, it may be more efficient to employ several evaporators 500. These evaporators 500 are connected here with connection conduits 933 which allow air flow to pass from an air flow outlet 525 of one evaporator 500 to a bypass valve 929. The bypass valve 929 may direct the air flow into an inlet of another evaporator 500 or to a bypass conduit, bypassing the remaining evaporators 500. There are sensors 827 which measure physical parameters such as temperature, relative humidity or other physical parameters. In this embodiment, they are at least measuring relative humidity. The output of the sensors 827 is provided to the control unit 825. The control unit 825 can then make determinations regarding the evaporators 500. For example, if the humidity sensed by sensor 827 after the first evaporator is 70% relative humidity, it is determined that the humidity should be increased. Therefore the control unit 825 will leave bypass valve 929 open allowing the air stream to pass to the second evaporator 500. A sensor 827 after the second evaporator 500, determines that the relative humidity is at 95% and determines that passing it through another evaporator will use more energy but will not produce significant additional amount of potable water. Therefore, control unit 825 decides to operate the bypass valve 929 between the second and third evaporators 500 causing the air stream to be redirected through a connection conduit 933. The air stream then bypasses the last evaporator 500 since no further evaporation is required for this air stream.

Figure 10:
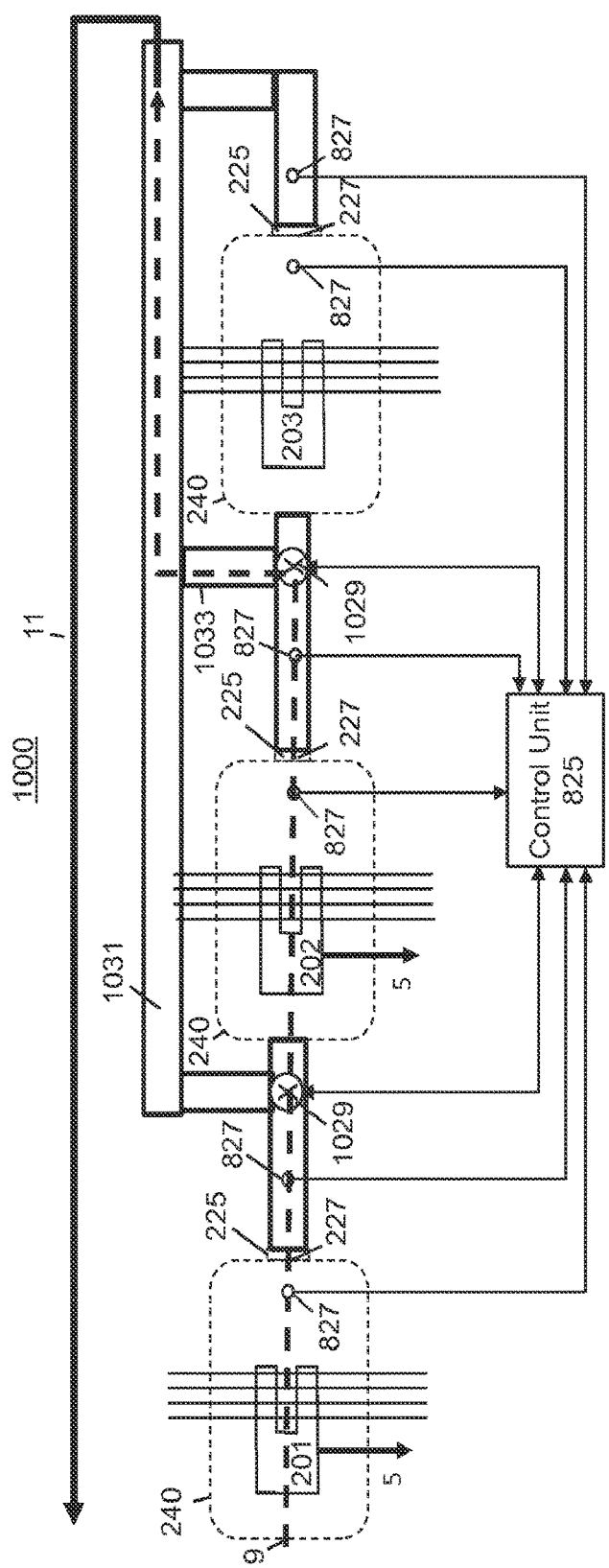
FIG. 10 shows an alternative embodiment of a portion of the system relating to the evaporator which may be merged into the systems of FIGS. 4, 6, 7 and 8.

FIG. 10 shows an alternative embodiment of a portion of the system relating to the condenser which may be merged into the systems of FIGS. 4, 6, 7, 8 and 9.

Depending upon the air flow rate, and the efficiency and size of the evaporator 500, it may be more efficient to employ several condensers 201, 202, 203. These condensers 201, 202, 203 have sensors 827 associated with them that provide information to the control unit 825. The control unit 825 can then make determinations regarding the condensers 201, 202, 203. For example, if the humidity sensed by sensor 827 after the first condenser 201 is not below a predetermined humidity level, it is determined that the humidity should be decreased and pass through a next condenser 202. Therefore the control unit 825 will leave the first bypass valve 1029 open allowing the air stream to pass to the second condenser 202. A sensor 827 after the second condenser 202 then determines that the relative humidity is below the predetermined humidity level. If it is decided that passing the air stream through another condenser 203 does not add much benefit, then control unit 825 operates the bypass valve 1029 between the second condenser 202 and the third condenser 203 causing the air stream to be redirected through a connection conduit 1033. The air stream then bypasses the last condenser 200 since no further condensation is required for this air stream. In this manner, the control unit can adjust various parameters of the system, such as adjusting air flow rate. It can adjust the number of evaporators that the air stream will pass through, the number of condensers it will pass through, the temperature of the coolant, the pressure in the evaporator 500 and the pressure surrounding the condensers 201, 202, 203. By adjusting these parameters, the system can optimize the collection of moisture from the atmosphere, the amount of potable water purified from salt water, waste water or other contaminated water.

Figure 11:
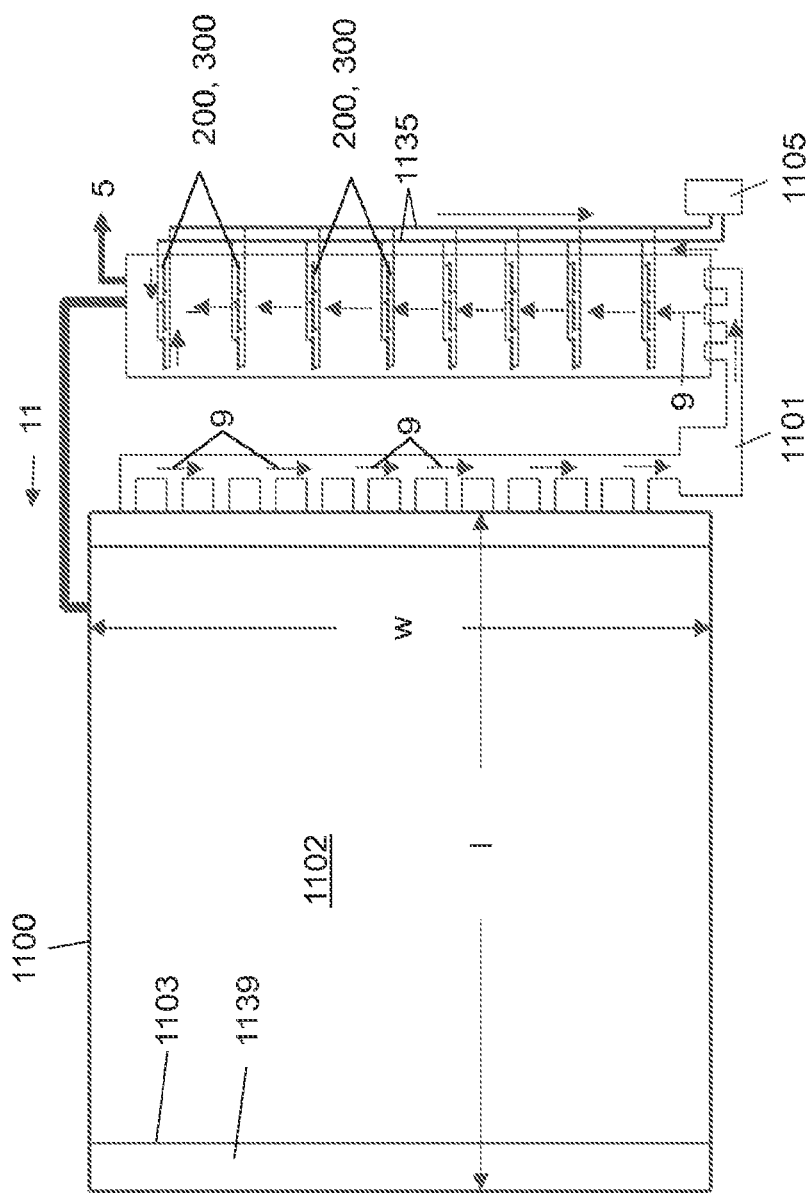
FIG. 11 shows a schematic plan view of an embodiment of the system according to the present invention employing the multiple condensers.
Figure 12:
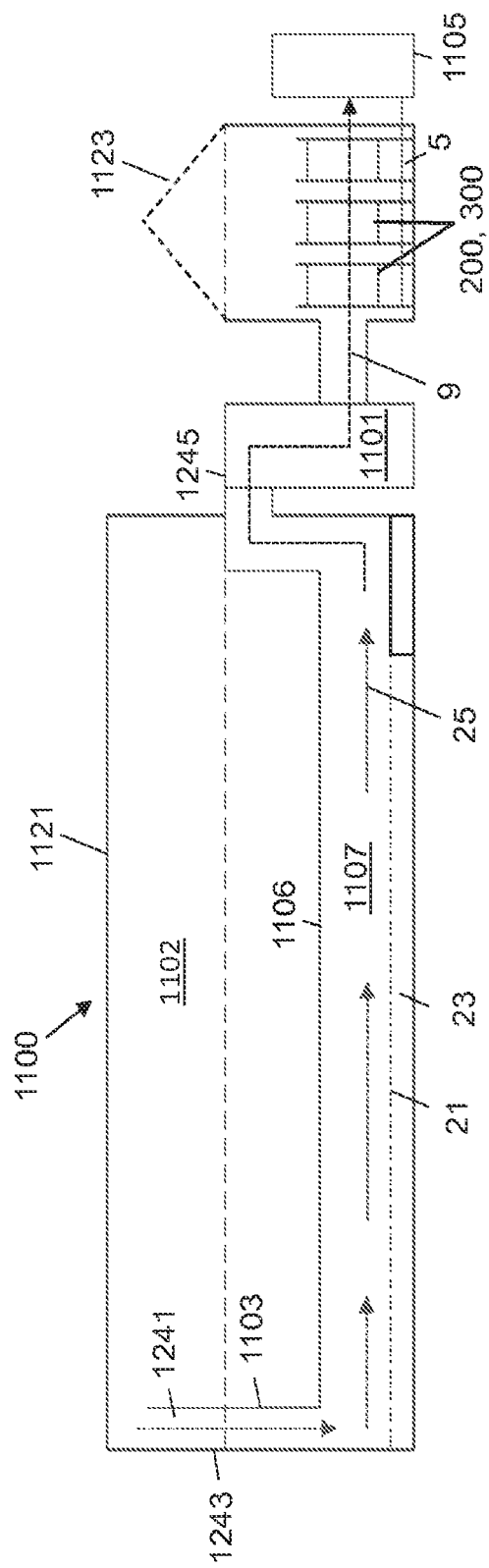
FIG. 12 shows a schematic elevational view of an embodiment of FIG. 11.

FIG. 11 shows a schematic plan view of an embodiment of the system according to the present invention employing the multiple condensers 200. FIG. 12 shows a schematic elevational view of an embodiment of FIG. 11. This embodiment will be described with respect to FIGS. 11 and 12. In this embodiment, an evaporator 1100, similar to that of FIG. 5, receives incoming air into a heating chamber 1102 which may be an area enclosed by a greenhouse-like structure 1121. Heating chamber 1102 may also be a chamber heated by solar light focused by lenses or by mirrors reflecting light. The air inside this heating chamber 1102 is heated and is then drawn as an air stream 25 downward into a passageway 1241 between an outer wall 1243 of the evaporator 1100 and a baffle 1103 by a fan 1101. The air stream 25 then passes over the surface 21 of non-potable water 23 causing evaporation of water vapor into the air stream 25 to create moist air 9.

Air stream 25 then passes through a separating convolution 1245 which causes droplets to hit the walls of the separating convolution 1245 and drop the water droplets of non-potable water which are swept into the air stream 25 as it passes over the non-potable water 23.

The resulting air is now moist air 9 carrying a significant amount of water vapor. This moist air 9 is then passed over a plurality of condensers each similar to condensers 200 and 300 of FIG. 3. Each of these condensers 200, 300 is cooled with a coolant 1135.

A coolant device 1105 receives and cools the coolant 1135 and passes this coolant 1135 through the condensers 200, 300. The coolant 1135 should be of a temperature which is below the dew point of the moist air 9. As the air passes over the condensers 200, 300, the water vapor in the air condenses and is collected as potable water 5. The condensers 200, 300 may be housed within a greenhouse-like structure 1123.

For clarity, sensors for temperature, pressure, humidity, air velocity and other physical parameters, a connected control unit and connections between the sensors, control unit and other elements including the fan 1101 and coolant device 1105 are not shown here for clarity, but exist in at least one of these embodiments. Also, the solar voltaic array, wind turbines and battery storage are not shown in this figure, but are assumed to be in the functional embodiment.

Figure 13:
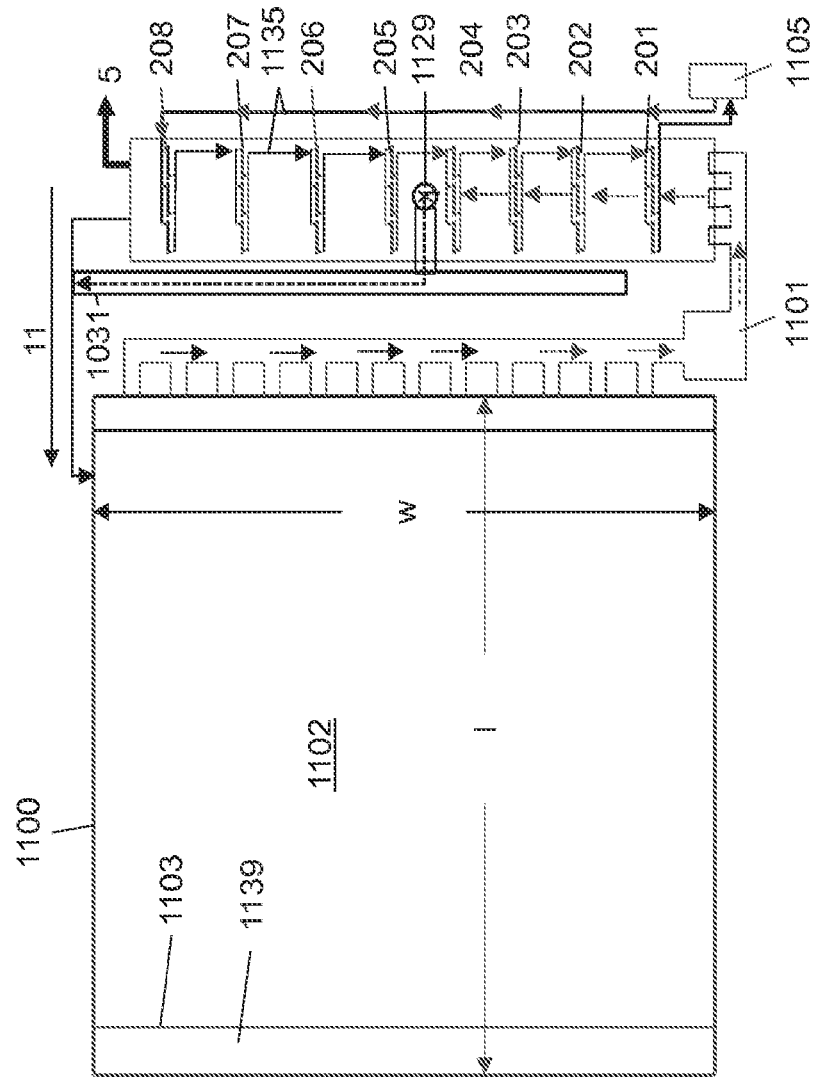
FIG. 13 shows a schematic plan view of an embodiment of the system according to the present invention employing the multiple condensers of FIG. 10.

FIG. 13 shows a schematic plan view of an embodiment of the system according to the present invention employing the multiple condensers of FIG. 10. In this embodiment, the evaporator 1100 and the fan 1101 function in the same manner as described in connection with FIGS. 11 and 12. However, this embodiment passes the moist air 9 by the condensers until the humidity level drops to a predetermined level then is directed by a bypass valve 1029 to a bypass conduit, bypassing the remaining condensers. This reduces the amount of air pressure drop and reduces the fan horsepower required.

FIG. 13 shows condensers 201, 202, 203, 204, 205, 206, 207 and 208 having their coolant lines connected in series. The coolant from coolant device 1105 first passes through condenser 208 then through condenser 207, then through condenser 206 . . . and then through condenser 201 and back to the coolant device 1105.

Due to this arrangement, the coldest condenser is condenser 208 and the warmest one is condenser 201 with the others having successively warmer temperatures moving from condenser 208 to condenser 201. Temperature sensors measure the coolant temperature as well as the air temperature between the condensers which is sent to a control unit. The control unit operates the elements of the systems and for example, would cause the coolant unit to reduce the coolant temperature so that the coolant at each condenser is below the dew point of the surrounding air stream.

The moist air 9 enters and passes by condenser 201, then 202, then 203 . . . then through 208. The moist air 9 loses moisture and cools as it moves past condenser 201, 202 . . . then 208. This then is a countercurrent thermal arrangement which maximizes condensation.

Driving airflow past the condensers requires power. At times, the amount of vapor that can be extracted does not warrant the energy required to extract it. Therefore, in this embodiment, there are humidity (and other) sensors between the condensers. When the humidity drops below a certain predetermined level, a bypass valve, such as that shown in FIG. 10 may be activated to cause the air stream 25 to be directed into a bypass conduit 1031 and bypass at least one of the condensers.

Method

Figure 14:
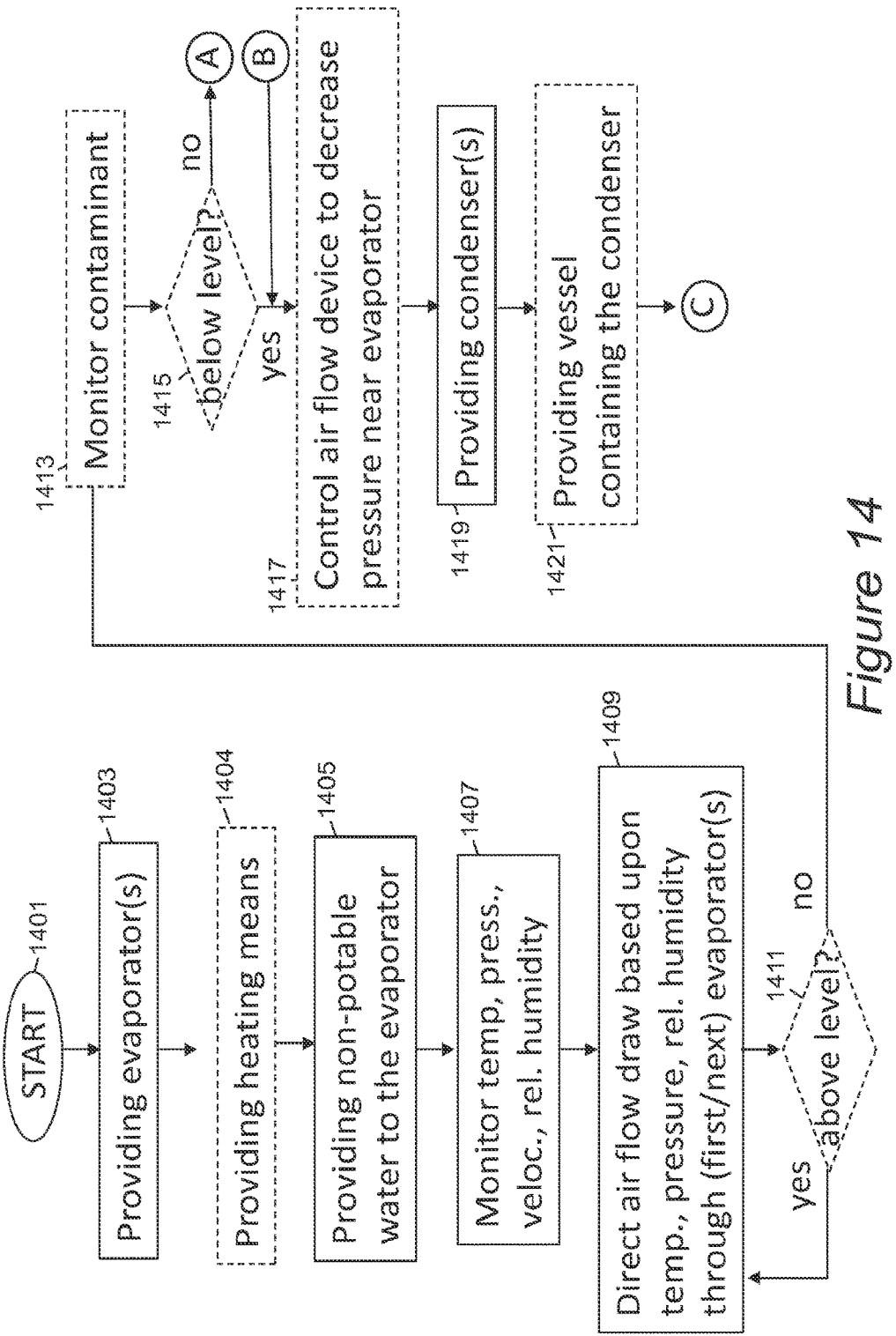
FIGS. 14, 15 and 16 together illustrate a flowchart illustrating the functioning of an embodiment of the current invention.
Figure 15:
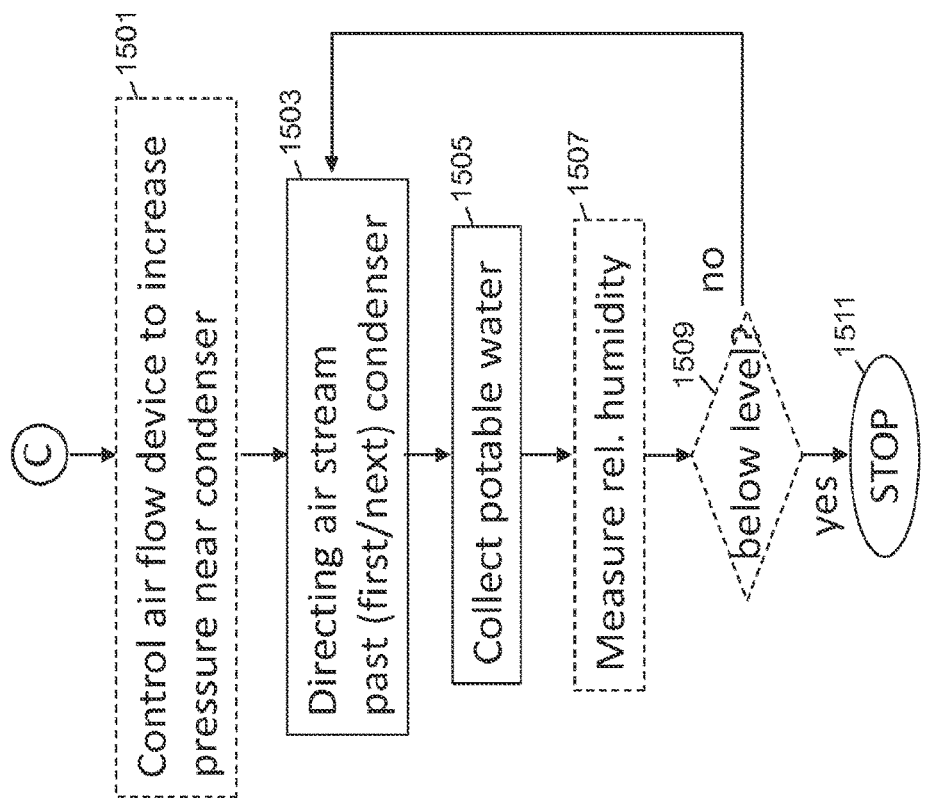
Figure 16:
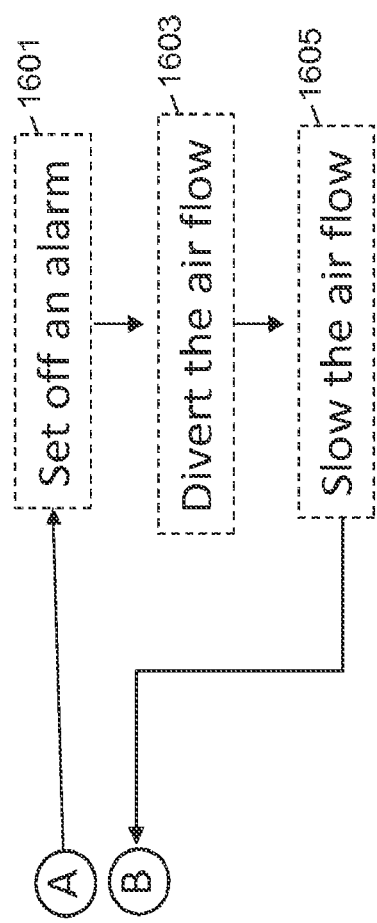

FIGS. 14, 15 and 16 together are a flowchart illustrating the functioning of an embodiment of the current invention being a method of efficiently creating potable water from non-potable water. The process starts at 1401. In step 1403 one or more evaporators are provided. One evaporator would be similar to the embodiment of FIGS. 4, 6 and 7, and multiple evaporators would be similar to the embodiment of FIG. 9.

These evaporators have a larger surface area than depth to maximize the surface area to mass ratio, as illustrated in FIG. 11. They also have an air flow passageway from the heating chamber through the evaporation chamber and out an air flow exit as shown in FIGS. 5 and 12. Optionally, as indicated later, additional heating device and additional heating may be provided to the heating chamber 501 of the evaporators 500, to increase evaporation of non-potable water 23.

In step 1405, the non-potable water is provided to the evaporation chamber from below. In step 1407, a physical parameter of at least one of the heating chamber, the evaporation chamber and the air flow exit are monitored by appropriate sensors. These physical parameters may be temperature, air pressure, relative humidity and air stream velocity.

In step 1409, the control unit controls the air flow device, which may be a fan or blower that is positioned at or near the air flow exit. The control device reads the monitored temperatures, pressures, relative humidity and air steam velocity and creates an air stream having a velocity causing it to reduce the air pressure in the evaporator drawing an air stream from the heating chamber through the evaporation chamber and out of the air flow exit evaporating water vapor into the air stream. The air flow device also directs the air stream from the air flow exit past condensers. The condensers have at least one surface held a temperature below the dew point of the air stream. The control unit calculates the dew point based upon the air stream temperature and relative humidity.

In the embodiments having multiple evaporators, in step 1411, the relative humidity exiting a condenser is monitored. If it is less than a predetermined relative humidity, the air stream is routed through another evaporator. The process is repeated either until the relative humidity exceeds the predetermined level, or there are no additional evaporators to further process the air stream.

In still another embodiment, the air stream exiting the evaporator does not exceed the required water content; the control unit may slow the air flow rate, or activate additional heaters which heat the air stream.

In step 1413, a contaminant sensor is provided in the air flow exit that can measure at least one contaminant in the air stream and provide the measurements to the control unit. In step 1415, the control unit determines if the amount of contaminants is below a safe acceptable level. If so, the processing continues at step 1417, if not, process continues at "A" of FIG. 16.

If the contaminants are above the acceptable level, in step 1601, optionally, an alarm, notification, or corrective message is provided to a user. Also, optionally, in step 1603, the air stream will be directed to a direction other than to the condenser, stopping the contaminated air stream from condensing into the potable water.

Also, optionally, in step 1605, the control unit can slow the velocity of the air stream, preventing more contaminants from being swept up into the air stream. After step 1605, processing continues at "B" of FIG. 14.

In step 1417 the operation of air flow device may be adjusted to adjust the air pressure in the evaporator. In still another embodiment, there is an air flow valve at the air flow exit of the evaporator. This can be adjusted to also increase or decrease the air pressure within the evaporator. This is under the control of the control unit.

In step 1419, at least one condenser is provided in the air stream. In step 1421, optionally a vessel may be provided which encloses the one or more condensers. This vessel has an air flow inlet and an air flow outlet. It may optionally have an air flow valve on the air flow outlet which may be adjusted by the control unit. Processing continues at "C" of FIG. 15.

Therefore, in step 1501, when the control unit partially closes the air flow valve, the air pressure within the vessel increases, and similarly, when the control unit partially opens the air flow valve, the air pressure in the vessel reduces.

In step 1503 the air stream is directed to the condenser and the potable water is collected in step 1505. If there is an embodiment having more than one condenser, then the humidity is measured in step 1507. In step 1509, if the measured humidity is below a predetermined humidity level, processing ends at step 1511. If the measured humidity is greater than a predetermined level, then the air stream is directed through a next condenser, if one exists. This process continues until either there are no more condensers to use or the measured humidity of the air stream exiting the condenser is below the predetermined level. This architecture causes the moisture to be continually run through condensers to extract water vapor which was not extracted by the previous condensers. This allows for an adjustable amount of condensation capacity to adjust for changes in ambient temperatures.

Please note that the embodiment of FIG. 1 may be varied to employ multiple condensers such as those shown in FIG. 10. In this embodiment, the adjustable condenser capacity will adjust for the differences in the ambient air temperature and relative humidity.

Similarly, the use of multiple evaporators in various embodiments shown allows for the interactive adjustment to adjust to changing sunlight and temperature conditions.

Implementation

The amount of water evaporated from a body of water in contact with circulating air can be calculated with the following equation:

$$E = k A (x_s - x)$$

where:
E=amount of evaporated water (kg/h)
k=(25+19 v)=evaporation coefficient (kg/m²h)
v=velocity of air above the water surface (m/s)
A=water surface area (m²)
$x_s$=humidity ratio in saturated air at the same temperature as the water surface (kg/kg)
x=humidity ratio in the air (kg/kg)

It was therefore determined that by using a 60 m by 60 m evaporator, the water surface area is 3600 sq. meters at a temperature of 140 Degrees F. (60 deg. C.), and an air flow velocity of 3.5 miles per hour (1.56 m./sec.), the saturated humidity ratio xs would be 0.421 kg/kg. The humidity ratio x would be 0.0285 kg/kg. In an air volume of 5400 m3, there would be 14,469,250 kg. of water evaporated each hour. If the air velocity were increased to 5 mph (2.235 m/sec.), this amount of water evaporated would then jump to 17,837,710 kg. each hour.

To detail the effects of air velocity and temperature on units designed to attain a potable water volume of 5.0 million gallons per day (MGD), assuming an evaporator efficiency of 60% and operating at 60 deg. C. and assuming condensers with a 60% water vapor removal efficiency, below is the water removal by stages for a 2-stage and a 3-stage condenser section:

2-stage condenser section (at 60 deg. C.)

|  | Input | Output |
| --- | --- | --- |
| Stage 1 | 2.16 | 1.29 |
| Stage 2 | 1.29 | 0.78 |
| Total |  | 2.07 |
|  |  | 2,070,000 |

3-stage condenser section (at 60 deg. C.)

|  | Input | Output |
| --- | --- | --- |
| Stage 1 | 2.16 | 1.29 |
| Stage 2 | 1.29 | 0.78 |
| Stage 3 | 0.78 | 0.47 |
| Total |  | 2.54 |
|  |  | 2,536,804 |

Now assuming an evaporator efficiency of 60% and at 80 deg. C. and assuming condensers with a 60% water vapor removal efficiency, below is the water removal by stages for a 2-stage stage condenser section:

2-stage condenser section (at 80 deg. C.)

|  | Input | Output |
| --- | --- | --- |
| Stage 1 | 5.24 | 3.14 |
| Stage 2 | 3.14 | 1.89 |
| Total |  | 5.03 |
|  |  | 5,029,233 |

It is apparent that a 2-stage unit operating at 60 deg. C. does not provide enough flow; using two 3-stage units will provide the desired flow. Now to compare this unit to the 2-stage unit operating at 80 deg. C.; while twice the water is produced so that only a single 2-stage unit is required to attain the desired 5 MGD output, the operating air temperature cannot be naturally attained and will need continuous additional energy inputs to attain the higher operating air temperature. If energy costs are the limiting factor in system design, the more efficient and sustainable method to attain the five million gallons per day is to use two 3-stage units operating at 60 deg. C. rather than one 2-stage unit operating at 80 deg. C. However, if the higher energy costs can be absorbed into the cost of the produced water, the lower capital costs of the single 2-stage unit becomes the preferred selection.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:
1. A system for producing potable water employing:
   a. an evaporator;
   b. a fan operatively connected to the evaporator for creating air stream of ambient air;
   c. a condenser within the air stream having a plurality of liquid conduits adapted to carry a liquid coolant thereby bringing the temperature of the condenser below the dew point of the ambient air causing moisture in the ambient air to condense on the condenser;
d. a vessel enclosing the condenser having an air flow exit allowing the air stream to exit the vessel, wherein the vessel is adapted to maintain a higher pressure within the vessel as compared with that outside of the vessel, thereby increasing the amount of condensation;
e. a cooling device which runs on electric power, coupled to the liquid conduits, wherein the cooling device is adapted to lower the temperature of the liquid coolant below a dew point of the ambient air;
f. an electric power source adapted to create electric power to power the system;
g. a plurality of sensors adapted to measure physical parameters of the system; and
h. a control unit coupled to the sensors, the fan, the cooling device and the electric power source, wherein the control unit is adapted to read information from the sensors and adjust elements of the system accordingly to optimize operation of the system.

2. The system of claim 1, further comprising a wind turbine for creating electric power to power the system.

3. The system of claim 2, further comprising a battery storage to receive and store electric power from at least one of the the electric power source and the wind turbine.

4. The system of claim 1, wherein the condenser further comprises:
a metal covering coupled to the liquid conduits, wherein the metal covering cools when the liquid coolant is passed through the liquid conduits, and the metal covering provides significant additional surface area to contact the ambient air and condense the water vapor.

5. The system of claim 4, wherein the condenser creates a microclimate being a volume of cooled air surrounding the metal covering and provides significant additional volume to contact the ambient air and condense the water vapor.

6. The system of claim 1, wherein the source of liquid is a body of water.

7. The system of claim 1, further comprising a coolant device adapted to reduce the temperature of the liquid coolant.

8. The system of claim 7, further comprising:
a heat exchanger coupled to the cooling device and the evaporator, wherein the heat exchanger is adapted to receive cool water from a water source and cool the cooling device, and the heat exchanger picks up heat from the cooling device which the heat exchanger provides to non-potable water being provided to the evaporator, thereby preheating the non-potable water.

9. The system of claim 7, further comprising a cooling tower to extract heat from the coolant device.

10. The system of claim 7 wherein the coolant device adapted to reduce the temperature is a water chiller.

11. The system of claim 1 wherein operation of the fan is adjustable and the control unit regulates the operation of the fan to adjust air pressure and air velocity within the vessel.

12. The system of claim 1, further comprising:
a. at least one pressure sensor adapted to measure air pressure within the vessel; and
b. wherein the control unit is coupled to the at least one pressure sensor and fan for interactively measuring air pressure within the vessel to adjust operation of the fan to optimize condensation.

13. The system of claim 11, further comprising:
a. a plurality of temperature sensors adapted to measure temperature at various locations within the system; and
b. a heating device in the evaporator;
c. wherein the control unit is coupled to at least one of the plurality of temperature sensors and the heating device for interactively measuring the temperature within the evaporator to adjust the heater operation to optimize evaporation.

14. A system for producing potable water from non-potable water comprising:
a. an evaporator having:
i. a chamber for receiving, containing and heating a stream of air;
ii. a second chamber for receiving non-potable water having an air passageway in contact with the non-potable water, the second chamber having an air flow exit;
iii. at least one air flow channel fluidically connecting the first chamber to the second chamber allowing the heated stream of air to pass from the first chamber through the second chamber and out of the airflow exit, thereby increasing the amount of water vapor in a moist air stream leaving the air flow exit;
b. a condenser fluidically coupled to the air flow exit of the evaporator adapted to receive the moist air stream, wherein the condenser includes a plurality of condensation surfaces cooled by a coolant to a temperature below the dew point, thereby causing the moist air stream to condense the water vapor into potable water;
c. a vessel enclosing the condenser to allow an air pressure within the vessel to be above an air pressure outside of the vessel, thereby improving condensation, wherein the vessel further comprises;
i. an air flow outlet;
ii. a fan adapted to adjust the air flow out of the condenser;
iii. at least one pressure sensor adapted to measure air pressure within the vessel;
iv. wherein the control unit is coupled to the at least one pressure sensor and to the fan and is adapted to control the air flow valve thereby regulating air flow out of the vessel and air pressure within the vessel;
d. at least one cooling unit adapted to cool the coolant to a temperature below the dew point of the moist air stream;
e. a plurality of sensors adapted to measure physical parameters of the system;
f. an electric power source adapted to create electric power to power the system; and
g. a control unit coupled to the sensors, the fan, the cooling device and the electric power source, wherein the control unit is adapted to read information from the sensors and adjust elements of the system accordingly to optimize operation of the system.

15. The system of claim 14, further comprising a wind turbine for creating electric power to power the system.

16. The system of claim 15, further comprising a battery storage to receive and store electric power from at least one of the electric power source and the wind turbine.

17. The system of claim 14 wherein the condenser has at least one conduit for receiving the coolant that is coupled to at least one condensation surface.

18. The system of claim 14 wherein the conduits are angled from a horizontal so that condensation may run down and collect at a lowest point, thereby reducing condensation from collecting on the conduit.

19. The system of claim 14 wherein the vessel further comprising comprises an air flow exit to regulate the amount of air that may be released thereby adjusting the air pressure inside of the vessel.

20. The system of claim 14, wherein the evaporator further comprises:
   a. an air inlet;
   b. at least one pressure sensor adapted to measure air pressure within the evaporator;
   c. wherein the control unit is coupled to the at least one pressure sensor and to the fan and is adapted to control the fan, thereby regulating the air flow into the evaporator and air pressure within the evaporator.

21. A system for creating potable water from non-potable water comprising:
   a. an evaporator section employing a plurality of evaporators, each having an air flow input for receiving input air and an air flow output for exhausting air; is
   b. wherein each evaporator adapted to evaporate non-potable water into an input air stream received at its air flow input and to create a moist air stream at its air flow output, and wherein the evaporators are connected in series such that the output of one is coupled to the input of the next;
   c. at least one humidity sensor near the air flow input of each evaporator capable of determining the relative humidity;
   d. a bypass conduit which bypasses at least one evaporator;
   e. at least one bypass valve adapted to divert the moist air stream to the bypass conduit when activated;
   f. a control unit coupled to the humidity sensors and the at least one bypass valve, adapted to sense when the humidity of the moist air stream exceeds a predetermined level and to activate at least one bypass valve causing the moist air stream to bypass at least one evaporator;
   g. a condenser section for receiving the moist air stream and condensing potable water from the moist air stream.

22. The system of claim 21, wherein at least one of the evaporators further comprises:
   a. an air flow inlet;
   b. an air flow valve on the air flow inlet adapted to adjust the air flow into the evaporator;
   c. at least one pressure sensor adapted to measure air pressure within the evaporator;
   d. wherein the control unit is coupled to the at least one pressure sensor and to the air flow valve and is adapted to control the air flow valve thereby regulating air stream into the evaporator and air pressure within the evaporator.

23. The system of claim 21, wherein the condenser comprises:
   a. a vessel at least partially enclosing the condenser;
   b. an air flow exit;
   c. an air flow valve on the air flow exit adapted to adjust the air stream out of the condenser section;
   d. at least one pressure sensor adapted to measure air pressure within the vessel;
   e. wherein the control unit is coupled to the at least one pressure sensor and to the air flow valve and is adapted to control the air flow valve thereby regulating air flow out of the vessel and air pressure within the vessel.

24. A system for creating potable water from non-potable water comprising:
   a. an evaporator for receiving an evaporating water vapor from the non-potable water, into a moist air stream flowing in a direction;
   b. a condenser section employing a plurality of condensers, each positioned behind a previous one within the direction of the moist stream such that the moist air stream must flow past a first condenser to reach a next condenser,
      wherein the condensers receive a liquid coolant to reduce their temperature below the dew point of the moist air stream;
   c. at least one humidity sensor between the condensers, for measuring the relative humidity of the moist air stream,
   d. a bypass conduit which bypasses at least one condenser;
   e. at least one bypass valve adapted to divert the moist air stream to the bypass conduit when in a first position and to allow the moist air stream to pass to a next condenser, when in a second position;
   f. a control unit coupled to the humidity sensors coupled to the at least one bypass valve, adapted to sense when the humidity of the moist air stream drops below a predetermined level and to put at least one bypass valve into a first position causing the moist air stream to bypass at least one condenser.

25. The system of claim 24, wherein the evaporator further comprises:
   a. an air flow inlet;
   b. an air flow valve on the air flow inlet adapted to adjust the air flow into the evaporator;
   c. at least one pressure sensor adapted to measure air pressure within the evaporator;
   d. wherein the control unit is coupled to the at least one pressure sensor and to the air flow valve and is adapted to control the air flow valve thereby regulating air flow into the evaporator and air pressure within the evaporator.

26. The system of claim 24, wherein at least one of the condensers further comprises:
   a. a vessel at least partially enclosing the condenser;
   b. an air flow outlet on the vessel;
   c. an air flow valve on the air flow outlet adapted to adjust the air flow out of the vessel;
   d. at least one pressure sensor adapted to measure air pressure within the vessel;
   e. wherein the control unit is coupled to the at least one pressure sensor and to the airflow valve and is adapted to control the air flow valve thereby regulating air flow out of the vessel and air pressure around the condenser.

27. A method of efficiently creating potable water from non-potable water comprising the steps of:
   a. providing an enclosed evaporator having a heating chamber heated at least in part by solar energy, and a plurality of evaporation chambers such that each evaporation chamber has a larger surface area than depth, an air flow passageway from the heating chamber through each of the evaporation chambers and out an air flow exit;
   b. providing a relative humidity sensor after each evaporation chamber;
   c. providing a control unit to sense a relative humidity of an air stream passing through each evaporation chamber;

d. using the control unit to cause the air stream to bypass the remaining evaporation chambers when the relative humidity is above a predetermined threshold level;
e. providing the non-potable water to each of the evaporation chambers;
f. monitoring at least one physical parameter of at least one of the heating chamber and the evaporation chambers and the air flow exit;
g. using the control unit to control an air flow device at the air flow exit based upon the monitored parameter causing the air flow device to draw an air stream from the heating chamber through the evaporation chambers and out of the air flow exit, thereby evaporating water vapor into the air stream; and
h. directing the air stream from the air flow exit past condensers having at least one surface held a temperature below the dew point of the air stream.

28. The method of claim 27 wherein a control unit is provided that controls the air flow device based upon the monitored parameter.

29. The method of claim 27 wherein the monitored parameter is at least one of temperature, air pressure and relative humidity.

30. The method of claim 29 wherein the control unit controls the air flow device to reduce the air pressure in the evaporation chambers, thereby increasing evaporation.

31. The method of claim 29 further comprising:
providing a vessel containing the condenser, wherein the control unit causes the air flow device to increase the air pressure in the vessel, thereby increasing condensation.

32. The method of claim 29 further comprising the step of:
providing a heater under the control of the control unit in order to heat the air in the heating chamber.

33. The method of claim 29 further comprising the steps of:
providing a vessel enclosing the condenser, and
controlling the air flow device to increase pressure inside the vessel enclosing the condenser.

34. The method of claim 19 further comprising the steps of:
monitoring a contaminant sensor in the air flow exit adapted to measure at least one contaminant in the air stream, and
providing the measurements to the control unit.

35. The method of claim 34 wherein the control unit is adapted to set off at least one of a notification, alarm, and corrective message.

36. The method of claim 34 wherein the control unit is adapted to direct the air stream to a direction other than to the condenser.

37. The method of claim 34 wherein the control unit is adapted to cause the air flow device to slow the air stream.

38. The method of claim 27 wherein:
a. a plurality of condensers is provided;
b. a relative humidity sensor is provided after each condenser;
c. the control unit senses the relative humidity of the air stream after passing through each condenser; and
d. the control unit causes the air stream to bypass the remaining condensers when the relative humidity is below a predetermined threshold level.

* * * * *